(12) United States Patent
Iraha et al.

(10) Patent No.: US 8,924,110 B2
(45) Date of Patent: Dec. 30, 2014

(54) CONTROL DEVICE FOR STEPLESS TRANSMISSION

(75) Inventors: Taira Iraha, Okazaki (JP); Kunio Hattori, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 177 days.

(21) Appl. No.: 13/583,105

(22) PCT Filed: Mar. 18, 2010

(86) PCT No.: PCT/JP2010/054679
§ 371 (c)(1),
(2), (4) Date: Sep. 6, 2012

(87) PCT Pub. No.: WO2011/114488
PCT Pub. Date: Sep. 22, 2011

(65) Prior Publication Data
US 2012/0329588 A1 Dec. 27, 2012

(51) Int. Cl.
*G06F 7/00* (2006.01)
*F16H 61/662* (2006.01)

(52) U.S. Cl.
CPC .............................. *F16H 61/66259* (2013.01)
USPC .................... 701/60; 701/59; 477/45; 477/46

(58) Field of Classification Search
CPC ............... F16H 61/016; F16H 61/662; F16H 2061/0087; F16H 2061/0078; F16H 2061/0093
See application file for complete search history.

(56) References Cited

U.S. PATENT DOCUMENTS

| 7,553,256 | B2 * | 6/2009 | Kim et al. ......................... 477/46 |
| 7,699,729 | B2 * | 4/2010 | Inoue et al. ...................... 474/28 |
| 8,105,191 | B2 * | 1/2012 | Toyoda et al. ................... 474/28 |
| 2005/0192133 | A1 | 9/2005 | Oshiumi et al. |
| 2005/0215393 | A1 * | 9/2005 | Shimoda .......................... 477/44 |
| 2010/0017080 | A1 | 1/2010 | Shimizu et al. |

FOREIGN PATENT DOCUMENTS

| JP | 2005-155674 | 6/2005 |
| JP | 2005-172011 | 6/2005 |
| JP | 2005-257067 | 9/2005 |

(Continued)

OTHER PUBLICATIONS

Translation of the International Preliminary Report on Patentability for PCT/JP2010/054679, filed on Mar. 18, 2010.

(Continued)

*Primary Examiner* — David D Le
(74) *Attorney, Agent, or Firm* — Finnegan, Henderson, Farabow, Garrett & Dunner, LLP

(57) ABSTRACT

When a rotational speed of a secondary pulley is less than a first reference value, the disclosed electronic control device implements lower limit hydraulic control to adjust the hydraulic pressure of a primary pulley to be at a lower limit hydraulic pressure. When the rotational speed is equal to or exceeds the first reference value, but is less than a second reference value, the electronic control device implements balanced hydraulic control to adjust the hydraulic pressure to be more than the lower limit hydraulic pressure. When the rotational speed is equal to or exceeds the second reference value, the electronic control device implements feedback control to correct the hydraulic pressure on the basis of the size of the difference between a target transmission gear ratio and a transmission gear ratio, calculated on the basis of rotational speeds detected by each rotational speed sensor.

9 Claims, 11 Drawing Sheets

(56) References Cited

FOREIGN PATENT DOCUMENTS

| | | |
|---|---|---|
| JP | 2008-20055 | 1/2008 |
| JP | 2009-257444 | 11/2009 |
| JP | 2010-249228 | 11/2010 |

OTHER PUBLICATIONS

International Search Report in International Application No. PCT/JP2010/054679; Mailing Date: Jun. 1, 2010.

* cited by examiner

CONTROL DEVICE FOR STEPLESS TRANSMISSION

CROSS-REFERENCE TO RELATED APPLICATIONS

This application is a national phase application of International Application No. PCT/JP2010/054679, filed Mar. 18, 2010, the content of which is incorporated herein by reference.

FIELD OF THE INVENTION

The present invention relates to a control device for a continuously variable transmission, which controls a continuously variable transmission of a belt type capable of changing a transmission gear ratio by varying the winding radius in each of a pair of pulleys of a belt wound upon the pulleys, and more particularly to a control device for a continuously variable transmission, which feedback controls a hydraulic pressure to be supplied to each of the pulleys based on a rotational speed of the pulley.

BACKGROUND OF THE INVENTION

As a continuously variable transmission to be provided on a vehicle, there is known a continuously variable transmission of a belt type that includes a primary pulley, to which a drive force of an internal combustion engine is transmitted, a secondary pulley coupled to a wheel, and a belt wound upon the pair of pulleys and serves to change the winding radius of the belt in each of the pulleys, thereby varying the transmission gear ratio continuously and steplessly.

A control device for controlling such a continuously variable transmission of a belt type changes hydraulic pressure in a hydraulic chamber provided in each of the pulleys to vary the groove width of each of the pulleys to which the belt is fitted, thereby changing the winding radius of the belt in each of the pulleys to control the transmission gear ratio.

More specifically, the control device raises the hydraulic pressure in the hydraulic chamber of the primary pulley to decrease the groove width of the primary pulley when the transmission gear ratio is reduced. Furthermore, the control device correspondingly reduces the hydraulic pressure of the hydraulic chamber of the secondary pulley to increase the groove width of the secondary pulley. Consequently, the winding radius of the belt in the primary pulley is increased, while the winding radius of the belt in the secondary pulley is reduced in a state in which the tension of the belt is ensured. As a result, it is possible to reduce the transmission gear ratio while suppressing a slip of the belt in each of the pulleys.

Moreover, the control device reduces the hydraulic pressure in the hydraulic chamber of the primary pulley to increase the groove width of the primary pulley, and raises the hydraulic pressure in the hydraulic chamber of the secondary pulley to reduce the groove width of the secondary pulley when the transmission gear ratio is increased. Consequently, the winding radius of the belt in the primary pulley is reduced, while the winding radius of the belt in the secondary pulley is increased in the state in which the tension of the belt is ensured. As a result, it is possible to increase the transmission gear ratio while suppressing slip of the belt in each of the pulleys.

The control device for a continuously variable transmission to be provided on a vehicle sets a target transmission gear ratio depending on a depression amount of an accelerator pedal, a vehicle speed, an engine speed or the like, and controls the hydraulic pressure in the hydraulic chamber of the pulley based on the target transmission gear ratio. The control device calculates the actual transmission gear ratio based on the rotational speed of the primary pulley and that of the secondary pulley when the hydraulic pressure in the hydraulic chamber of the pulley is controlled, and feedback controls the hydraulic pressure in the hydraulic chamber of the pulley based on the difference of the actual transmission gear ratio from the target transmission gear ratio.

In a case in which the control device includes a rotational speed sensor of an electromagnetic pickup type as a rotational speed sensor for detecting a rotational speed of a power transmission system in order to detect the rotational speed of the pulley, precision in detection is reduced or the detection itself of the rotational speed cannot be carried out when a rotational speed of a detection target is low du to the characteristics of the sensor. For this reason, when the rotational speed of the detection target is reduced significantly as in a state immediately before stopping of the vehicle, the rotational speed of the pulley cannot be detected accurately, and the actual transmission gear ratio cannot be calculated precisely. As a result, a proper feedback control cannot be executed, and a gear change control might be unstable.

In the control device for a continuously variable transmission described in Patent Document 1, therefore, when it is estimated that the vehicle speed is less than the reference vehicle speed, and the rotational speed of the secondary pulley cannot be detected accurately by the rotational speed sensor, hydraulic oil is removed from the hydraulic chamber of the primary pulley to reduce the hydraulic pressure in the hydraulic chamber of the primary pulley.

If the hydraulic oil is removed from the hydraulic chamber of the primary pulley, the primary pulley is expanded by the tension of the belt, and the groove width of the primary pulley is maintained at the maximum groove width within a changeable range. By employing a configuration for removing the hydraulic oil from the hydraulic chamber of the primary pulley when estimating that the rotational speed of the secondary pulley cannot be detected accurately as described above, therefore, it is possible to maintain the transmission gear ratio at the maximum transmission gear ratio also in a situation in which a proper feedback control cannot be executed.

PRIOR ART DOCUMENT

Patent Document

Patent Document 1: Japanese Laid-Open Patent Publication No. 2005-172011

SUMMARY OF THE INVENTION

In a case in which the configuration for removing the hydraulic oil from the hydraulic chamber of the primary pulley to maintain the transmission gear ratio at the maximum transmission gear ratio is employed as described above, however, the hydraulic chamber of the primary pulley has the hydraulic oil removed therefrom when the vehicle speed is raised to be equal to or exceed the reference vehicle speed again, and the rotational speed of the pulley can be detected accurately by the rotational speed sensor. For this reason, the groove width of the primary pulley cannot be reduced quickly when restarting a normal gear change control, and the transmission gear ratio cannot be varied quickly with the restart of the normal gear change control. Moreover, the tension of the belt might be insufficient, resulting in slip of the belt in the pulley.

It is an objective of the present invention to provide a control device for a continuously variable transmission that can maintain the transmission gear ratio at the maximum transmission gear ratio also in a state in which the transmission gear ratio cannot be calculated with high precision and can quickly restart a change in the transmission gear ratio through a feedback control when the transmission gear ratio can be calculated with high precision.

Precision in a rotational speed detected by a rotational speed sensor is improved as the rotational speed is increased. Therefore, precision in a transmission gear ratio calculated based on the rotational speed of each pulley is improved as the rotational speed of the pulley is increased, that is, as the rotational speed of a power transmission system is increased.

In order to achieve the objective, therefore, a control device for a continuously variable transmission according to the present invention switches a control mode for a hydraulic pressure of a primary pulley depending on a rotational speed detected by a rotational speed sensor for detecting a rotational speed of a power transmission system.

When the hydraulic pressure of the primary pulley is reduced, the primary pulley is expanded by the tension of the belt, and the winding radius of the belt in the primary pulley is reduced. As the hydraulic pressure of the primary pulley is reduced, the transmission gear ratio can be increased.

Therefore, when it is estimated that a rotational speed detected by a rotational speed sensor is less than a first reference value and the rotational speed of the pulley is increased so that precision in a calculation of the transmission gear ratio is reduced, the control device for a continuously variable transmission according to the present invention executes a lower limit hydraulic control capable of regulating the hydraulic pressure of the primary pulley into a lower limit hydraulic pressure capable of setting the transmission gear ratio to be a maximum transmission gear ratio.

The continuously variable transmission has variations in the characteristics caused by fabrication tolerances or the like. For this reason, even if the hydraulic pressure of the primary pulley is regulated to the same equal hydraulic pressure, the transmission gear ratio varies. In consideration of such variations in the characteristics of the continuously variable transmission, even if the characteristic of the continuously variable transmission has a variation, the lower limit hydraulic pressure is set to be a very low hydraulic pressure in which a winding radius in the primary pulley has a minimum value when the hydraulic pressure of the primary pulley is reduced down to the lower limit hydraulic pressure.

If the lower limit hydraulic control is executed when the rotational speed is less than the first reference value as described above, the primary pulley is expanded by the tension of the belt and the winding radius of the belt in the primary pulley is reduced, and the transmission gear ratio is maintained at the maximum transmission gear ratio in a state in which the precision in the calculation of the transmission gear ratio is low.

Moreover, the control device for a continuously variable transmission according to the present invention sets the hydraulic pressure of the primary pulley to be a hydraulic pressure higher than the lower limit hydraulic pressure when the rotational speed detected by the rotational speed sensor is equal to or exceeds the first reference value. Furthermore, the control device for a continuously variable transmission according to the present invention executes a feedback control for the hydraulic pressure of the primary pulley on the basis of the difference between a transmission gear ratio calculated based on the rotational speed of the pulley and a target transmission gear ratio when it is estimated that the rotational speed detected by the rotational speed sensor is equal to or exceeds a second reference value, which is larger than the first reference value and the precision in the calculation of the transmission gear ratio is increased.

When the rotational speed detected by the rotational speed sensor is equal to or exceeds the first reference value and the transmission gear ratio can be calculated with higher precision than in a case in which the rotational speed is less than the first reference value, the hydraulic pressure of the primary pulley is raised. When the rotational speed detected by the rotational speed sensor is equal to or exceeds the second reference value and the transmission gear ratio can be calculated with still higher precision, the actual transmission gear ratio is calculated based on the rotational speed of the pulley and the hydraulic pressure of the primary pulley is subjected to the feedback control based on the difference between the calculated transmission gear ratio and the target transmission gear ratio.

In other words, according to the control device for a continuously variable transmission in accordance with the present invention, when the hydraulic pressure of the primary pulley is raised in advance based on the fact that the rotational speed detected by the rotational speed sensor has been increased to be equal to or exceed the first reference value, and then, the rotational speed is raised to be equal to or exceed the second reference value and the transmission gear ratio can be calculated with high precision, the hydraulic pressure of the primary pulley has already been raised.

When the transmission gear ratio can be calculated with high precision, accordingly, the hydraulic pressure of the primary pulley is properly regulated through the feedback control and the change in the transmission gear ratio can be restarted quickly.

In other words, according to the control device for a continuously variable transmission in accordance with the present invention, it is possible to maintain the transmission gear ratio at the maximum transmission gear ratio also in a state in which the transmission gear ratio cannot be calculated with high precision, and to quickly restart the change in the transmission gear ratio through the feedback control when the transmission gear ratio can be calculated with high precision.

The first reference value is preferably set based on a lower limit of the rotational speed that allows calculation of a transmission gear ratio based on the rotational speed of each of the pulleys. By employing the configuration, when it is estimated that the rotational speed detected by the rotational speed sensor is equal to or exceeds the first reference value and the actual transmission gear ratio cannot be calculated, the primary pulley is expanded by the tension of the belt and the winding radius of the belt in the primary pulley is reduced, and the transmission gear ratio is maintained at the maximum transmission gear ratio. When it is estimated that the rotational speed detected by the rotational speed sensor is equal to or exceeds the first reference value and the transmission gear ratio can be calculated, the hydraulic pressure of the primary pulley is increased more greatly than in the state in which the actual transmission gear ratio cannot be calculated.

The second reference value is preferably set based on a lower limit of the rotational speed that allows calculation of a transmission gear ratio with necessary precision for the feedback control based on the rotational speed of each of the pulleys. By employing the configuration, when it is estimated that the rotational speed detected by the rotational speed sensor is equal to or exceeds the second reference value and the transmission gear ratio can be calculated with necessary precision for the feedback control, the actual transmission gear ratio is calculated based on the rotational speed of the pulley and the hydraulic pressure of the primary pulley is subjected to the feedback control on the basis of the difference between the calculated transmission gear ratio and the target transmission gear ratio.

In order to switch a control mode for the hydraulic pressure of the primary pulley based on the rotational speed detected by the rotational speed sensor as described above, it is desirable that a secondary rotational speed sensor for detecting a rotational speed of a secondary pulley should be employed as a rotational speed sensor for detecting a rotational speed of a power transmission system.

When the vehicle speed is low and the rotational speed of the power transmission system is low, the transmission gear ratio is often increased and the rotational speed of the secondary pulley is lower than that of the primary pulley. For this reason, the rotational speed of the secondary pulley tends to have lower detection precision than that of the rotational speed of the primary pulley. When the detection precision in the rotational speed of the secondary pulley is reduced, the transmission gear ratio cannot be calculated with high precision.

In this respect, by monitoring the rotational speed of the secondary pulley and switching the control mode for the hydraulic pressure of the primary pulley based on the rotational speed of the secondary pulley, it is possible to switch the control mode in such a configuration as to conform to a variation in the calculation precision in the transmission gear ratio.

When the rotational speed is equal to or exceeds the first reference value and is less than the second reference value, the control device preferably executes a balanced hydraulic control for regulating the hydraulic pressure of the primary pulley to a minimum hydraulic pressure required for maintaining a transmission gear ratio at a maximum transmission gear ratio without slip of the belt over each of the pulleys.

According to the configuration described above, when the rotational speed detected by the rotational speed sensor is equal to or exceeds the second reference value in a state in which the target transmission gear ratio is set to be the maximum transmission gear ratio, the hydraulic pressure of the primary pulley has already been regulated to a minimum hydraulic pressure required for maintaining the transmission gear ratio at the maximum transmission gear ratio. When the rotational speed detected by the rotational speed sensor is equal to or exceeds the second reference value and the transmission gear ratio can be calculated with high precision, accordingly, it is possible to quickly cause the actual transmission gear ratio to match the maximum transmission gear ratio through the feedback control.

A minimum value of the pressure of the primary pulley that is required for maintaining the transmission gear ratio at the maximum transmission gear ratio without a slip of the belt wound upon the pulley can be calculated based on a torque input from the internal combustion engine to the primary pulley, a winding radius of the belt in the primary pulley in a case in which the transmission gear ratio is maintained at the maximum transmission gear ratio, a frictional coefficient between the primary pulley and the belt, a gradient of a portion in the primary pulley with which the belt comes in contact, and a pressure receiving area of a movable sheave in the primary pulley.

According to one aspect of the present invention, it is desirable that there should further be provided a learning value acquiring unit for acquiring a learning value based on a correction value calculated through the feedback control, and the learning value acquired by the learning value acquiring unit through a previous feedback control should be utilized to correct the hydraulic pressure of the primary pulley when a balanced hydraulic control is executed.

As described above, the continuously variable transmission has variations in characteristics due to fabrication tolerances or the like. For this reason, even if the minimum hydraulic pressure required for maintaining the transmission gear ratio at the maximum transmission gear ratio is calculated as the target hydraulic pressure and the hydraulic pressure of the primary pulley is regulated to a hydraulic pressure that is equal to the target hydraulic pressure in the balanced hydraulic control, the actual transmission gear ratio is displaced from the maximum transmission gear ratio in some cases.

In this respect, by employing the configuration in which the learning value acquired by the learning value acquiring unit through the previous feedback control is utilized to correct the hydraulic pressure of the primary pulley when executing the balanced hydraulic control as described above, it is possible to grasp the characteristic of the continuously variable transmission based on the learning value acquired through the previous feedback control, thereby executing the balanced hydraulic control conforming to the characteristic.

In order to execute the balanced hydraulic control conforming to the characteristics of the continuously variable transmission, it is desirable that the learning value acquiring unit should set the learning value based on the correction value such that the correction amount of the hydraulic pressure in the balanced hydraulic control is increased when the correction amount of the balanced hydraulic pressure in the feedback control is increased.

By employing the configuration, the learning value is set such that the correction amount of the hydraulic pressure in the balanced hydraulic control is increased when it is estimated that the correction amount of the balanced hydraulic pressure in the feedback control is large and the hydraulic pressure of the primary pulley required for maintaining the transmission gear ratio at the target transmission gear ratio is greatly displaced from the balanced hydraulic pressure. Therefore, it is possible to execute the balanced hydraulic control conforming to the actual characteristic of the continuously variable transmission, thereby maintaining the transmission gear ratio at the maximum transmission gear ratio more properly through the balanced hydraulic control.

Moreover, there may further be provided the learning value acquiring unit for acquiring a learning value based on the magnitude of an overshoot of the rotational speed of the pulley, which is generated when change in the transmission gear ratio is started through the feedback control after a transition from the balanced hydraulic control to the feedback control, and the learning value acquired by the learning value acquiring unit through the previous feedback control may be utilized to correct the hydraulic pressure of the primary pulley when the balanced hydraulic control is executed.

In a case in which the configuration is employed, it is possible to suppress the overshoot of the rotational speed of the pulley, which is generated when starting the change in the transmission gear ratio by correcting the hydraulic pressure of the primary pulley, which is regulated through the balanced hydraulic control based on the learning value acquired on the basis of the magnitude of the overshoot of the rotational speed of the pulley, which is generated previously.

In order to suppress the overshoot, it is desirable that the learning value acquiring unit should set the learning value based on the magnitude of the overshoot such that the greater the overshoot, the greater the correction amount of the hydraulic pressure in the balanced hydraulic control becomes.

DETAILED DESCRIPTION OF THE PREFERRED EMBODIMENTS

First Embodiment

A control device for a continuously variable transmission according to a first embodiment of the present invention will be described below with reference to FIGS. 1 to 7. In the first embodiment, the control device is materialized as an electronic control device 300 for controlling a vehicle in an overall manner.

Figure 1:
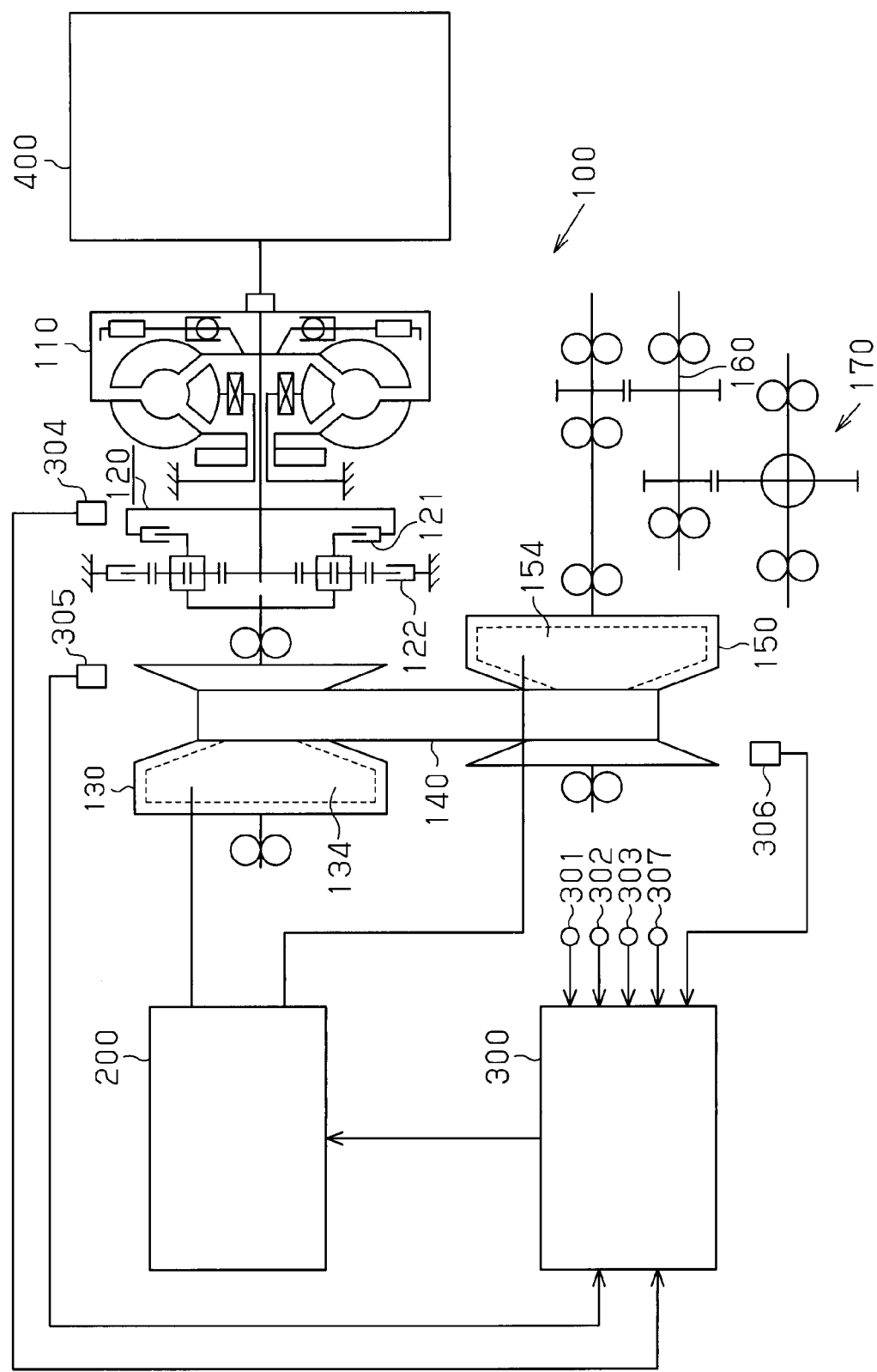
FIG. 1 is a diagram showing schematic structures of an electronic control device and a continuously variable transmission, which is a control target of the electronic control device, according to a first embodiment.

FIG. 1 is a diagram showing a schematic structure of the electronic control device 300, which is a control device for a continuously variable transmission according to the present invention, and a continuously variable transmission 100, which is a control target of the electronic control device 300.

As shown in FIG. 1, an input shaft of a torque converter 110 in the continuously variable transmission 100 is connected to an output shaft of an internal combustion engine 400. On the other hand, an output shaft of the torque converter 110 is connected to an input shaft of a switching mechanism 120.

The switching mechanism 120 is a planetary gear mechanism of a double pinion type and includes a forward clutch 121 and a reverse brake 122. An output shaft of the switching mechanism 120 is coupled to a primary pulley 130.

When the forward clutch 121 is engaged and the reverse brake 122 is disengaged, consequently, drive force of the internal combustion engine 400, which is input through the torque converter 110, is transmitted, with no change, to the primary pulley 130. In contrast, when the forward clutch 121 is disengaged and the reverse brake 122 is engaged, the drive force of the internal combustion engine 400, which is input through the torque converter 110, is inverted and transmitted as a reverse revolution drive force to the primary pulley 130.

In the switching mechanism 120, both the forward clutch 121 and the reverse brake 122 are disengaged so that the transmission of the drive force between the internal combustion engine 400 and the primary pulley 130 is blocked.

The primary pulley 130 is coupled to a secondary pulley 150 by means of a belt 140. In other words, the single belt 140 is wound upon the primary pulley 130 and the secondary pulley 150, which are arranged in parallel as shown in a center of FIG. 1. Consequently, the drive force is transmitted through the belt 140 between the primary pulley 130 and the secondary pulley 150.

The secondary pulley 150 is coupled to a differential gear 170 through a reduction gear 160 as shown in a portion on a lower and right side of FIG. 1. Consequently, the revolution of the secondary pulley 150 is transmitted to the differential gear 170 through the reduction gear 160. Then, the drive force transmitted to the differential gear 170 is transmitted to left and right drive wheels through the differential gear 170.

Figure 2A:
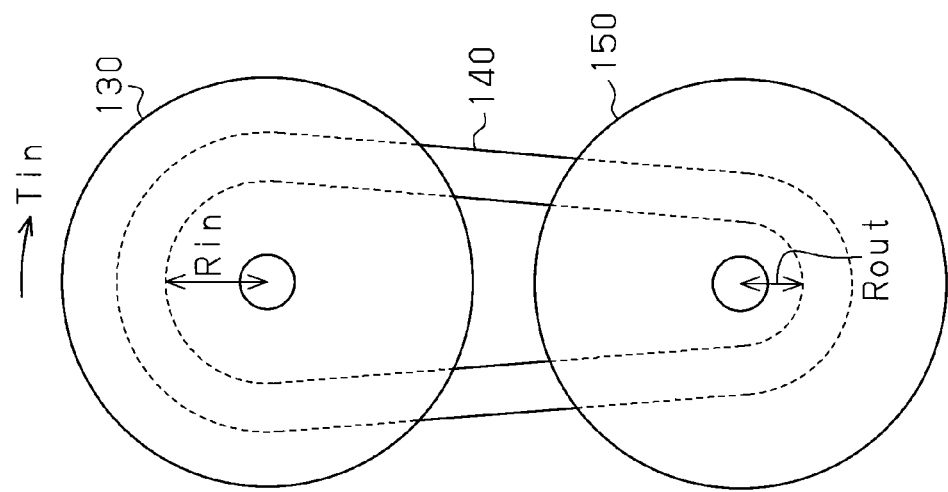
FIG. 2(a) is a cross-sectional view showing the pulleys of the continuously variable transmission.

As shown in an upper part of FIG. 2(a), the primary pulley 130 includes a fixed sheave 131 and a movable sheave 132. The movable sheave 132 is incorporated into a housing 133 movably with respect to the housing 133, and a hydraulic chamber 134 is defined between the housing 133 and the movable sheave 132.

As shown in a lower part of FIG. 2(a), the secondary pulley 150 also includes a fixed sheave 151 and a movable sheave 152. In the same manner as the primary pulley 130, the movable sheave 152 in the secondary pulley 150 is also incorporated into a housing 153 movably with respect to the housing 153. Consequently, a hydraulic chamber 154 is also defined between the housing 153 and the movable sheave 152 in the secondary pulley 150.

Figure 2B:
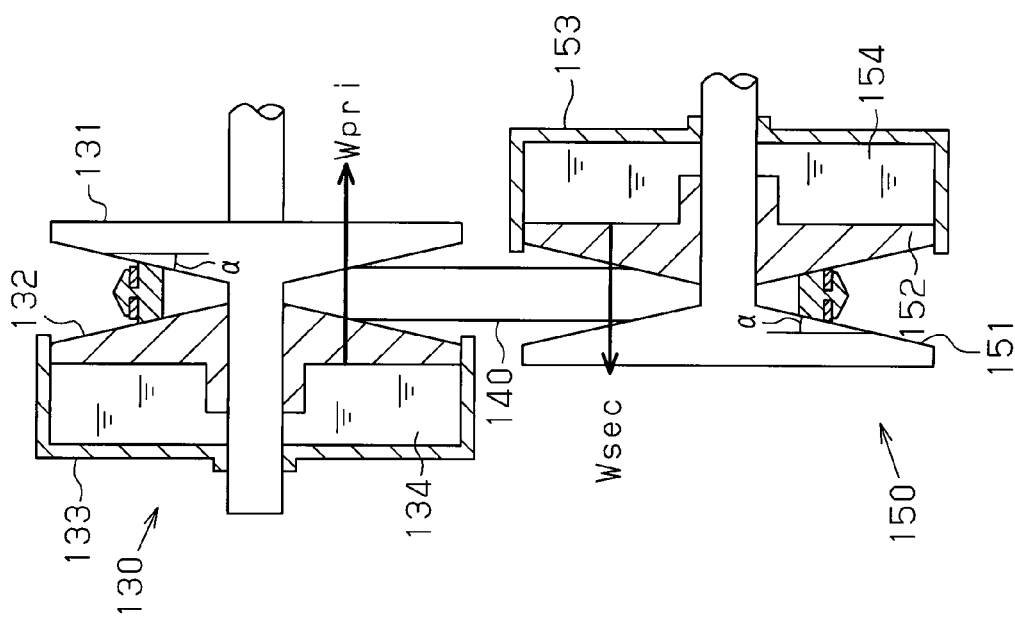
FIG. 2(b) is a side view showing the pulleys of the continuously variable transmission.

As shown in FIGS. 2(a) and 2(b), the belt 140 is wound upon the primary pulley 130 and the secondary pulley 150. The belt 140 is interposed between the fixed sheave 131 and the movable sheave 132 in the primary pulley 130, and furthermore, is interposed between the fixed sheave 151 and the movable sheave 152 in the secondary pulley 150.

For this reason, a hydraulic pressure Pin in the hydraulic chamber 134 of the primary pulley 130 is varied so that the interval between the fixed sheave 131 and the movable sheave 132 in the primary pulley 130 is changed and a thrust Wpri acting on the belt 140 in the primary pulley 130 is varied. The thrust Wpri in the primary pulley 130 can be calculated as a product of the pressure receiving area of the movable sheave 132 and the hydraulic pressure Pin in the hydraulic chamber 134.

Moreover, a hydraulic pressure Pout in the hydraulic chamber 154 of the secondary pulley 150 is varied so that the interval between the fixed sheave 151 and the movable sheave 152 in the secondary pulley 150 is changed and a thrust Wsec acting on the belt 140 in the secondary pulley 150 is varied. The thrust Wsec in the secondary pulley 150 can be calculated as a product of the pressure receiving area of the movable sheave 152 and the hydraulic pressure Pout in the hydraulic chamber 154.

As shown in FIG. 2(a), each of the sheaves 131, 132, 151 and 152 has a gradient in a portion to come in contact with the belt 140. For this reason, the hydraulic pressure Pin in the hydraulic chamber 134 is varied to change the thrust Wpri and the hydraulic pressure Pout in the hydraulic chamber 154 is varied to change the thrust Wsec. Consequently, winding radii Rin and Rout of the belt 140 in the respective pulleys 130 and 150 are varied.

More specifically, the hydraulic pressure Pin of the hydraulic chamber 134 is increased to increase the thrust Wpri in the primary pulley 130 and the hydraulic pressure Pout of the hydraulic chamber 154 is decreased to decrease the thrust Wsec in the secondary pulley 150. Consequently, the winding radius Rin of the belt 140 in the primary pulley 130 is increased and the winding radius Rout of the belt 140 in the secondary pulley 150 is reduced. On the other hand, the hydraulic pressure Pin of the hydraulic chamber 134 is decreased to decrease the thrust Wpri in the primary pulley 130 and the hydraulic pressure Pout of the hydraulic chamber 154 is increased to increase the thrust Wsec in the secondary pulley 150. Consequently, the winding radius Rin of the belt 140 in the primary pulley 130 is decreased and the winding radius Rout of the belt 140 in the secondary pulley 150 is increased.

In the continuously variable transmission 100, the hydraulic pressures Pin and Pout in the hydraulic chambers 134 and 154 of the pulleys 130 and 150 are varied to change the winding radii Rin and Rout of the belt 140 in the pulleys 130 and 150 so that a transmission gear ratio $\gamma$ is controlled.

More specifically, in a case in which the transmission gear ratio $\gamma$ is reduced, the hydraulic pressure Pin of the hydraulic chamber 134 in the primary pulley 130 is raised to increase the winding radius Rin of the belt 140 in the primary pulley 130. In addition, the hydraulic pressure Pout of the hydraulic chamber 154 in the secondary pulley 150 is correspondingly dropped to reduce the winding radius Rout of the belt 140 in the secondary pulley 150. In a state in which the tension of the belt 140 is ensured, the winding radius Rin of the belt 140 in the primary pulley 130 is increased and the winding radius Rout of the belt 140 in the secondary pulley 150 is reduced, and the transmission gear ratio $\gamma$ can be reduced without a slip of the belt 140 over the pulleys 130 and 150.

On the other hand, in a case in which the transmission gear ratio $\gamma$ is increased, the hydraulic pressure Pin of the hydraulic chamber 134 in the primary pulley 130 is dropped to reduce the winding radius Rin of the belt 140 in the primary pulley 130. In addition, the hydraulic pressure Pout of the hydraulic chamber 154 in the secondary pulley 150 is raised to increase the winding radius Rout of the belt 140 in the secondary pulley 150. In a state in which the tension of the belt 140 is ensured, the winding radius Rin of the belt 140 in the primary pulley 130 is reduced and the winding radius Rout of the belt 140 in the secondary pulley 150 is increased, and the transmission gear ratio $\gamma$ can be increased without slip of the belt 140 over the pulleys 130 and 150.

As shown in FIG. 1, the hydraulic chambers 134 and 154 of the pulleys 130 and 150 are connected to a hydraulic control unit 200. The hydraulic control unit 200 is a hydraulic circuit including a plurality of solenoid valves driven based on a command sent from the electronic control device 300. Oil pressure of hydraulic oil is regulated to supply the hydraulic oil to each of the hydraulic chambers 134 and 135 or to discharge the hydraulic oil in each of the hydraulic chambers 134 and 154, thereby regulating the hydraulic pressures Pin and Pout in the hydraulic chambers 134 and 154.

The electronic control device 300 includes a central processing unit (CPU) for executing a calculation processing related to a control of the internal combustion engine 400, a calculation processing related to a control of the continuously variable transmission 100 through the hydraulic control unit 200 and the like. Moreover, the electronic control device 300 includes a read only memory (ROM) for storing calculation programs and calculation maps for the calculation processing and various data, a random access memory (RAM) for temporarily storing results of calculations, a writable nonvolatile memory capable of holding stored information even if supply of power is stopped, and the like.

As shown in FIG. 1, the following sensors are connected to the electronic control device 300.

An accelerator position sensor 301 detects a depression amount of an accelerator pedal by a driver. An air flow meter 302 detects an intake air amount GA, which is the amount of air introduced into the internal combustion engine 400. A crank angle sensor 303 detects an engine speed NE based on a rotation angle of a crankshaft, which is an output shaft of the internal combustion engine 400. A turbine rotational speed sensor 304 is provided in the vicinity of the switching mechanism 120 and serves to detect a rotational speed of a turbine of the torque converter 110. A primary rotational speed sensor 305 is a rotary encoder of an electromagnetic pickup type, and is provided in the vicinity of the primary pulley 130 and serves to detect a rotational speed Nin of the primary pulley 130. A secondary rotational speed sensor 306 is also the same rotary encoder of the electromagnetic pickup type as the primary rotational speed sensor 305, and is provided in the vicinity of the secondary pulley 150 and serves to detect a rotational speed Nout of the secondary pulley 150. A wheel speed sensor 307 is a similar rotary encoder of the electromagnetic pickup type as the rotational speed sensors 305 and 306, and is provided in the vicinity of each of wheels and serves to detect a rotational speed of each of the wheels.

The electronic control device 300 controls in an overall manner the internal combustion engine 400 and the continuously variable transmission 100 based on signals output from the various sensors 301 to 307. For example, a vehicle speed SPD is calculated based on the rotational speed Nout of the secondary pulley 150, which is detected by the secondary rotational speed sensor 306. Moreover, a required torque is calculated based on the depression amount of the accelerator pedal, which is detected by the accelerator position sensor 301, and the current vehicle speed SPD. Then, a gear change control is executed for adjusting an opening of a throttle valve of the internal combustion engine 400 to regulate the intake air amount GA in order to implement the required torque and driving the hydraulic control unit 200 in order to calculate a target transmission gear ratio $\gamma$trg to cause the transmission gear ratio $\gamma$ to match the target transmission gear ratio $\gamma$trg.

In the gear change control, the electronic control device 300 calculates the actual transmission gear ratio $\gamma$ based on the rotational speed Nin of the primary pulley 130 and the rotational speed Nout of the secondary pulley 150 and feedback controls the hydraulic pressure Pin of the primary pulley 130 to cause the calculated transmission gear ratio $\gamma$ to match the target transmission gear ratio $\gamma$trg. Thus, the hydraulic pressure Pin of the primary pulley 130 is controlled, and furthermore, the hydraulic pressure Pout of the secondary pulley 150 is varied corresponding to a change in the hydraulic pressure Pin such that slip of the belt 140 can be suppressed. Consequently, the transmission gear ratio γ is varied while slip of the belt 140 over the respective pulleys 130 and 150 is suppressed.

Due to the characteristics of the rotational speed sensors 305 and 306, when the rotational speeds Nin and Nout of the pulleys 130 and 150 are very low, precision in the detection of the rotational speeds Nin and Nout is reduced or the detection itself cannot be carried out in some cases.

For this reason, when the vehicle speed SPD is very low as in a state brought immediately before a stopping of the vehicle, the rotational speed Nout of the secondary pulley 150 is reduced considerably, and the rotational speed Nout cannot be detected accurately. As a result, the actual transmission gear ratio γ cannot be calculated accurately based on the rotational speeds Nin and Nout detected by the rotational speed sensors 305 and 306, and the feedback control cannot be carried out precisely. Consequently, the gear change control might be unstable.

In contrast, if it is determined that the rotational speed Nout of the secondary pulley 150 cannot be detected accurately based on the fact that the vehicle speed SPD is less than a reference vehicle speed as described in Patent Document 1, the hydraulic oil may be removed from the hydraulic chamber 134 of the primary pulley 130, thereby reducing the hydraulic pressure Pin.

If the hydraulic oil is removed from the hydraulic chamber 134, the movable sheave 132 of the primary pulley 130 is expanded by the tension of the belt 140, and the groove width of the primary pulley 130 is maintained at the maximum groove width within the changeable range. Also in a situation in which the feedback control cannot be executed, therefore, it is possible to maintain the transmission gear ratio γ at a maximum transmission gear ratio γmax.

However, in a case in which a configuration for removing the hydraulic oil from the hydraulic chamber 134 of the primary pulley 130 is employed to maintain the transmission gear ratio γ at the maximum transmission gear ratio γmax based on the fact that the vehicle speed SPD is less than the reference vehicle speed as described above, the vehicle speed SPD is equal to or exceeds the reference vehicle speed and the hydraulic oil of the hydraulic chamber 134 is removed when the change in the transmission gear ratio γ through a normal gear change control is restarted. For this reason, it is impossible to quickly decrease the groove width of the primary pulley 130 when restarting the gear change control. As a result, slip is caused over the belt 140 in the respective pulleys 130 and 150 with the restart of the change in the transmission gear ratio γ or the transmission gear ratio γ cannot be changed quickly after the rotational speed Nout can be detected accurately by means of the secondary rotational speed sensor 306.

Figure 3:
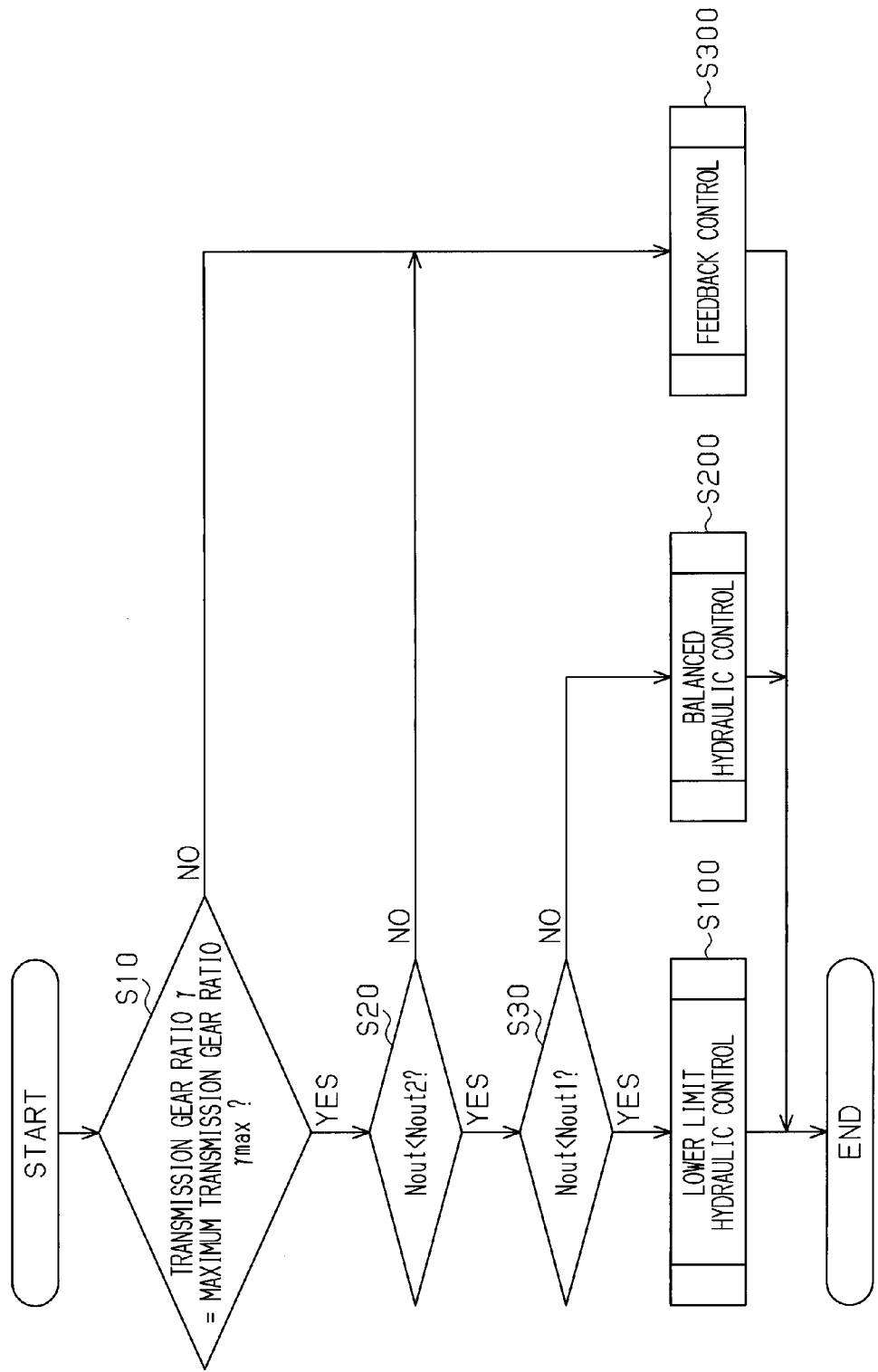
FIG. 3 is a flowchart showing a serial processing flow related to a gear change control switching routine according to the first embodiment.

Referring to the electronic control device 300 according to the present embodiment, therefore, a gear change control switching routine shown in FIG. 3 is executed when the target transmission gear ratio γtrg is set into the maximum transmission gear ratio γmax or set in the vicinity of the maximum transmission gear ratio γmax. Thus, the control mode for the hydraulic pressure Pin of the primary pulley 130 is switched depending on the rotational speed Nout of the secondary pulley 150.

With reference to FIGS. 3 to 6, the contents of the gear change control switching routine will be described below in detail. FIG. 3 is a flowchart showing a serial processing flow related to the gear change control switching routine according to the present embodiment. The gear change control switching routine is repetitively executed in a predetermined control cycle by the electronic control device 300 when the target transmission gear ratio γtrg is equal to the maximum transmission gear ratio γmax and when the target transmission gear ratio γtrg is set to have a value in the vicinity of the maximum transmission gear ratio γmax.

When the gear change control switching routine is started, the electronic control device 300 first determines whether the transmission gear ratio γ has already been equal to the maximum transmission gear ratio γmax at the time of the start of the gear change control switching routine at Step S10 as shown in FIG. 3.

If it is determined that the transmission gear ratio γ is not equal to the maximum transmission gear ratio γmax (Step S10: NO), that is, if it is determined that the transmission gear ratio γ is different from the maximum transmission gear ratio γmax at Step S10, the routine proceeds to Step S300 and the electronic control device 300 executes the same feedback control as the normal gear change control at Step S300.

Figure 4:
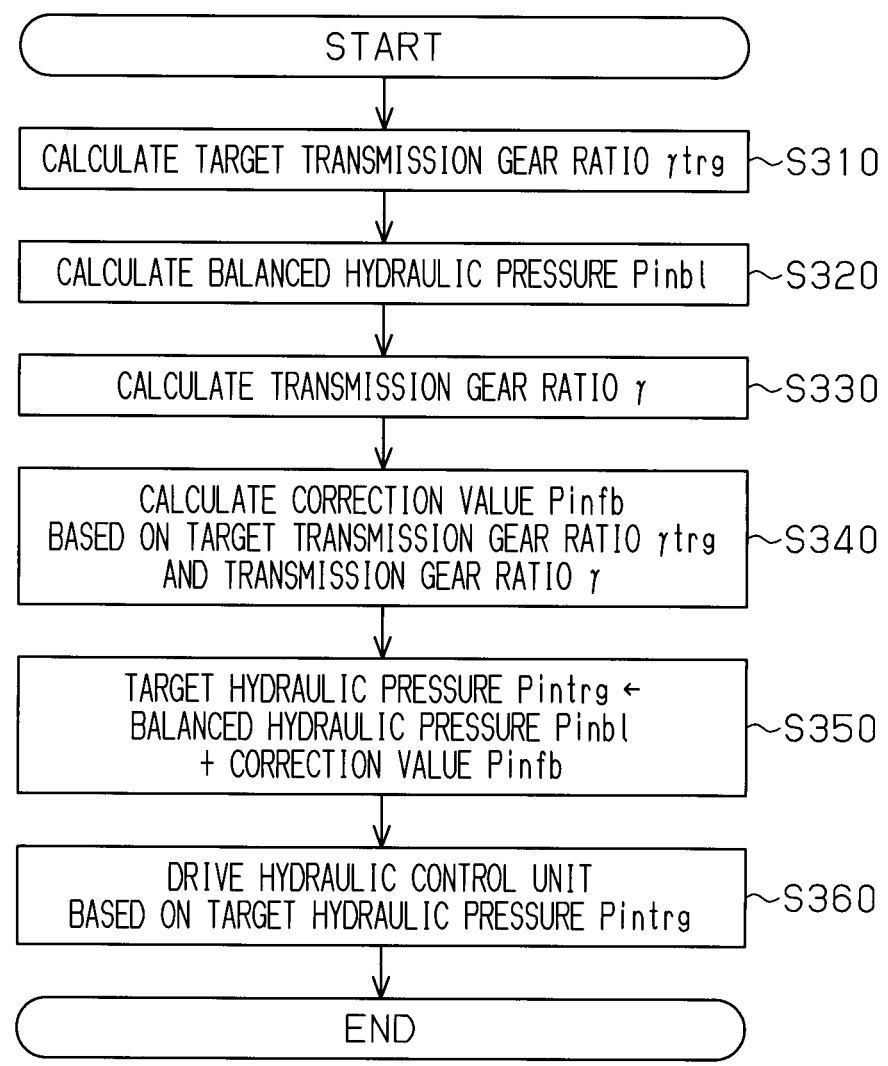
FIG. 4 is a flowchart showing a serial processing flow related to a feedback control in the gear change control switching routine according to the first embodiment.

When the feedback control is started, the electronic control device 300 first calculates the target transmission gear ratio γtrg at Step S310 as shown in FIG. 4. Herein, the target transmission gear ratio γtrg is calculated based on a prepared gear change map in order to implement the engine speed NE capable of efficiently generating the required torque calculated based on the depression amount of the accelerator pedal and the current vehicle speed SPD.

When the target transmission gear ratio γtrg is calculated at Step S310, the electronic control device 300 calculates a balanced hydraulic pressure Pinbl, which is the minimum hydraulic pressure Pin that is required for maintaining the transmission gear ratio γ at the target transmission gear ratio γtrg at Step S320.

The balanced hydraulic pressure Pinbl is a basic value in the calculation of a target hydraulic pressure Pintrg, which is a target value of the hydraulic pressure Pin in the primary pulley 130. First, a lower limit thrust Wmin, which is the minimum thrust required for maintaining the transmission gear ratio γ at the target transmission gear ratio γtrg without slip of the belt 140 over the respective pulleys 130 and 150, is calculated, and the balanced hydraulic pressure Pinbl is calculated based on the lower limit thrust Wmin.

The lower limit thrust Wmin is calculated in accordance with the following Equation (1) based on an input torque Tin to the primary pulley 130, which is a torque for a transmission through the belt 140 as shown in an arrow of FIG. 2(*b*), a winding radius Rin in a case in which the transmission gear ratio γ has the same value as the target transmission gear ratio γtrg, a frictional coefficient μ between the primary pulley 130 and the belt 140 and the angle α of the gradient in a portion in the primary pulley 130 with which the belt 140 comes in contact as shown in FIG. 2(*a*).

$$W\text{min} = (T\text{in} \cdot \cos \alpha)/(2\mu \cdot R\text{in})$$ Equation (1)

At Step S320, then, the value of the lower limit thrust Wmin is divided by the pressure receiving area of the movable sheave 132 in the hydraulic chamber 134 of the primary pulley 130 to calculate the balanced hydraulic pressure Pinbl. In other words, the balanced hydraulic pressure Pinbl is a quotient obtained through a division of the lower limit thrust Wmin by the pressure receiving area of the movable sheave 132.

When the balanced hydraulic pressure Pinbl is calculated at Step S320, the electronic control device 300 calculates the transmission gear ratio γ based on the rotational speeds Nin and Nout detected by the rotational speed sensors 305 and 306 at Step S330. The transmission gear ratio γ is a quotient obtained through a division of the rotational speed Nin of the primary pulley 130 by the rotational speed Nout of the secondary pulley 150.

When the transmission gear ratio γ is calculated at Step S330, the electronic control device 300 calculates a correction value Pinfb based on the target transmission gear ratio γtrg and the calculated transmission gear ratio γ at Step S340. The correction value Pinfb is a feedback correction value of the target hydraulic pressure Pintrg set to cause the transmission gear ratio γ to match the target transmission gear ratio γtrg, and is a value to be added to the balanced hydraulic pressure Pinb1 when the target hydraulic pressure Pintrg is calculated. The correction value Pinfb is calculated based on the difference between the target transmission gear ratio γtrg and the transmission gear ratio γ such that a correction amount of the target hydraulic pressure Pintrg is increased as the difference between the target transmission gear ratio γtrg and the transmission gear ratio γ is increased. The correction value Pinfb is calculated as a positive value in order to increase the target hydraulic pressure Pintrg when the transmission gear ratio γ is more than the target transmission gear ratio γtrg, and is calculated as a negative value in order to decrease the target hydraulic pressure Pintrg when the transmission gear ratio γ is less than the target transmission gear ratio γtrg.

When the correction value Pinfb is calculated at Step S340, the electronic control device 300 sets the target hydraulic pressure Pintrg at Step S350. Herein, a value calculated by adding the correction value Pinfb to the balanced hydraulic pressure Pinb1 is set as the target hydraulic pressure Pintrg.

When the target hydraulic pressure Pintrg is thus set at Step S350, the electronic control device 300 drives the hydraulic control unit 200 based on the target hydraulic pressure Pintrg in order to cause the hydraulic pressure Pin in the hydraulic chamber 134 to match the target hydraulic pressure Pintrg at Step S350.

Moreover, the electronic control device 300 thus varies the hydraulic pressure Pin in the hydraulic chamber 134, and furthermore, drives the hydraulic control unit 200 corresponding to the variation in the hydraulic pressure Pin in order to suppress slip of the belt 140 in the respective pulleys 130 and 150, thereby changing the hydraulic pressure Pout of the hydraulic chamber 154 to execute the gear change control.

When the gear change control is executed through the feedback control, the electronic control device 300 once ends the gear change control switching routine.

On the other hand, if it is determined that the transmission gear ratio γ is equal to the maximum transmission gear ratio γmax at Step S10 (Step S10: YES), the gear change control switching routine proceeds to Step S20. Then, the electronic control device 300 determines whether the rotational speed Nout detected by the secondary rotational speed sensor 306 is less than a second reference value Nout2 at Step S20.

The second reference value Nout2 is a lower limit of the rotational speed Nout, which allows calculation of the transmission gear ratio γ with necessary precision for the feedback control based on the rotational speeds Nin and Nout of the pulleys 130 and 150, which are detected by the rotational speed sensors 305 and 306.

In other words, if the rotational speed Nout is equal to or exceeds the second reference value Nout2, the rotational speeds Nin and Nout can be detected with high precision by the rotational speed sensors 305 and 306 and the transmission gear ratio γ can be calculated with necessary precision for the feedback control based on the rotational speeds Nin and Nout thus detected.

If it is determined that the rotational speed Nout is equal to or exceeds the second reference value Nout2 at Step S20 (Step S20: NO), the routine proceeds to Step S300. Then, the electronic control device 300 executes the feedback control as described above at Step S300.

On the other hand, if it is determined that the rotational speed Nout is less than the second reference value Nout2 at Step S20 (Step S20: YES), the gear change control switching routine proceeds to Step S30. At Step S30, subsequently, the electronic control device 300 determines whether the rotational speed Nout is less than the first reference value Nout1.

The first reference value Nout1 is the lower limit of the rotational speed Nout that allows calculation of the transmission gear ratio γ based on the rotational speeds Nin and Nout of the pulleys 130 and 150, which are detected by the rotational speed sensors 305 and 306.

In other words, when the rotational speed Nout is less than the first reference value Nout1, the rotational speed Nout cannot be detected by the secondary rotational speed sensor 306, and the transmission gear ratio γ cannot be calculated.

On the other hand, when the rotational speed Nout is equal to or exceeds the first reference value Nout1, the rotational speed Nout of the secondary pulley 150 can be detected by the secondary rotational speed sensor 306, and the transmission gear ratio γ can be calculated based on the detected rotational speeds Nin and Nout. When the rotational speed Nout is less than the second reference value Nout2 as described above, however, precision in the detection of the rotational speed Nout is low and the transmission gear ratio γ can be calculated based on the detected rotational speeds Nin and Nout but cannot be calculated with the necessary precision for the feedback control.

At Step S30, therefore, it is determined whether the rotational speed Nout can be detected by the secondary rotational speed sensor 306. Based on non-detection, it is determined that the rotational speed Nout is less than the first reference value Nout1.

If it is determined that the rotational speed Nout is equal to or exceeds the first reference value Nout1 (Step S30: NO), that is, the rotational speed Nout can be detected by the secondary rotational speed sensor 306 at Step S30, the gear change control switching routine proceeds to Step S200. Then, the electronic control device 300 executes a balanced hydraulic control at Step S200.

Figure 5:
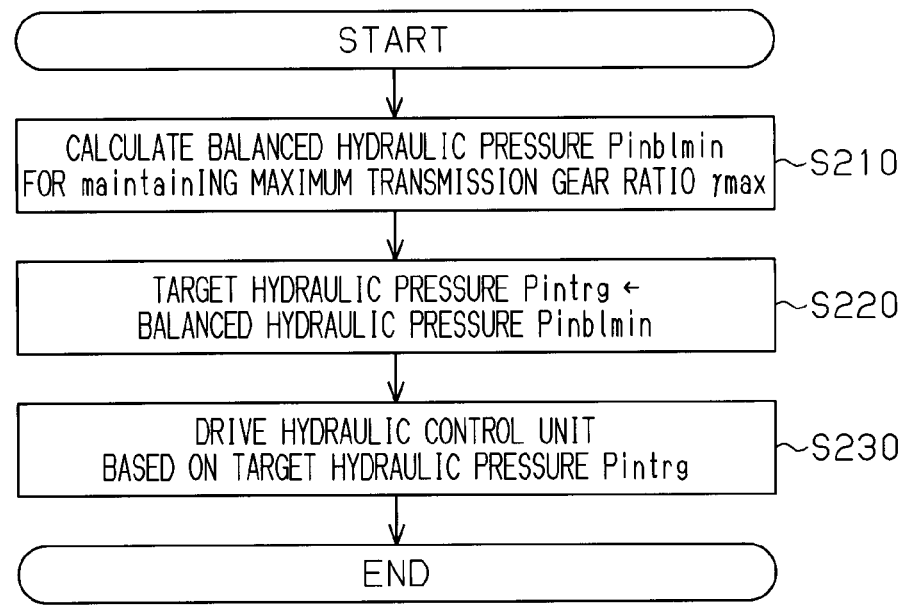
FIG. 5 is a flowchart showing a serial processing flow related to a balanced hydraulic oil control in the gear change control switching routine according to the first embodiment.

When the balanced hydraulic control is started, the electronic control device 300 first calculates a balanced hydraulic pressure Pinb1min, which is the necessary balanced hydraulic pressure Pinb1 for maintaining the transmission gear ratio γ at the maximum transmission gear ratio γmax, at Step S210 as shown in FIG. 5.

In the same manner as the method of calculating the balanced hydraulic pressure Pinb1 at Step S320 for the feedback control, a winding radius Rin in a case in which the transmission gear ratio γ is equal to the maximum transmission gear ratio γmax is input as the winding radius Rin to Equation (1) to calculate the balanced hydraulic pressure Pinb1min.

When the balanced hydraulic pressure Pinb1min for maintaining the transmission gear ratio γ at the maximum transmission gear ratio γmax is calculated at Step S210, the processing proceeds to Step S220 and the electronic control device 300 sets, with no change, the balanced hydraulic pressure Pinb1min thus calculated as the target hydraulic pressure Pintrg.

Subsequently, the electronic control device 300 drives the hydraulic control unit 200 based on the target hydraulic pressure Pintrg at Step S230.

In other words, referring to the balanced hydraulic control, the feedback control of the hydraulic pressure Pin based on the difference between the target transmission gear ratio γtrg and the transmission gear ratio γ is not carried out but the hydraulic control unit 200 is driven so as to cause the hydraulic pressure Pin of the primary pulley 130 to match the balanced hydraulic pressure Pinb1min.

When the gear change control is thus executed through the balanced hydraulic control, the electronic control device 300 once ends the gear change control switching routine.

On the other hand, if it is determined that the rotational speed Nout is less than the first reference value Nout1 (Step S30: YES), that is, the rotational speed Nout cannot be detected by the secondary rotational speed sensor 306 at Step S30, the gear change control switching routine proceeds to Step S100. Then, the electronic control device 300 executes a lower limit hydraulic control at Step S100.

Figure 6:
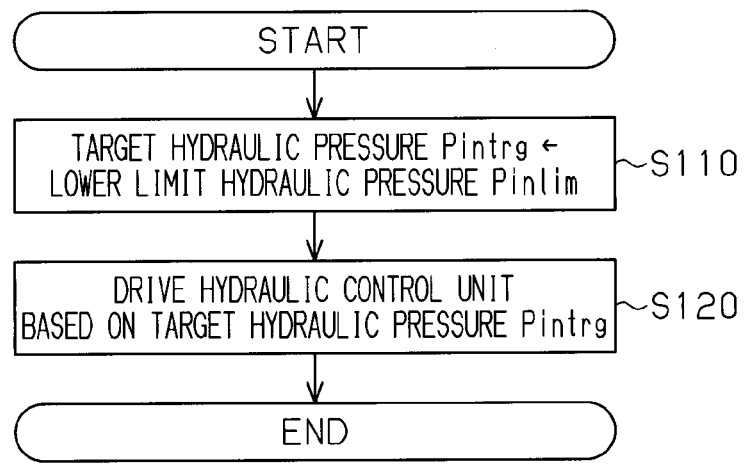
FIG. 6 is a flowchart showing a serial processing flow related to a lower limit hydraulic control in the gear change control switching routine according to the first embodiment.

When the lower limit hydraulic control is started, the electronic control device 300 first sets the lower limit hydraulic pressure Pinlim as the target hydraulic pressure Pintrg at Step S110 as shown in FIG. 6.

The lower limit hydraulic pressure Pinlim is set as the hydraulic pressure Pin capable of causing the transmission gear ratio γ to be equal to the maximum transmission gear ratio γmax based on a result of an experiment performed in advance, or the like.

The continuously variable transmission 100 has variations in characteristics, which are caused by fabrication tolerances or the like. For this reason, also in some cases in which the hydraulic pressure Pin of the primary pulley 130 is dropped to the same hydraulic pressure, the transmission gear ratio γ has variations. In this respect, even if the characteristics are varied, the magnitude of the lower limit hydraulic pressure Pinlim is set to cause the winding radius Rin to have a minimum value by dropping the hydraulic pressure Pin down to the lower limit hydraulic pressure Pinlim, by taking into consideration the variations in the characteristics of the continuously variable transmission 100.

When the target hydraulic pressure Pintrg is set at Step S110, the processing proceeds to Step S120 and the electronic control device 300 drives the hydraulic control unit 200 based on the set target hydraulic pressure Pintrg.

In other words, referring to the lower limit hydraulic control, the feedback control of the hydraulic pressure Pin based on the difference between the target transmission gear ratio γtrg and the transmission gear ratio γ is not carried out but the hydraulic control unit 200 is driven so as to cause the hydraulic pressure Pin of the primary pulley 130 to match the lower limit hydraulic pressure Pinlim.

When the gear change control is thus executed through the lower limit hydraulic control, the electronic control device 300 once ends the gear change control switching routine.

Figure 7:
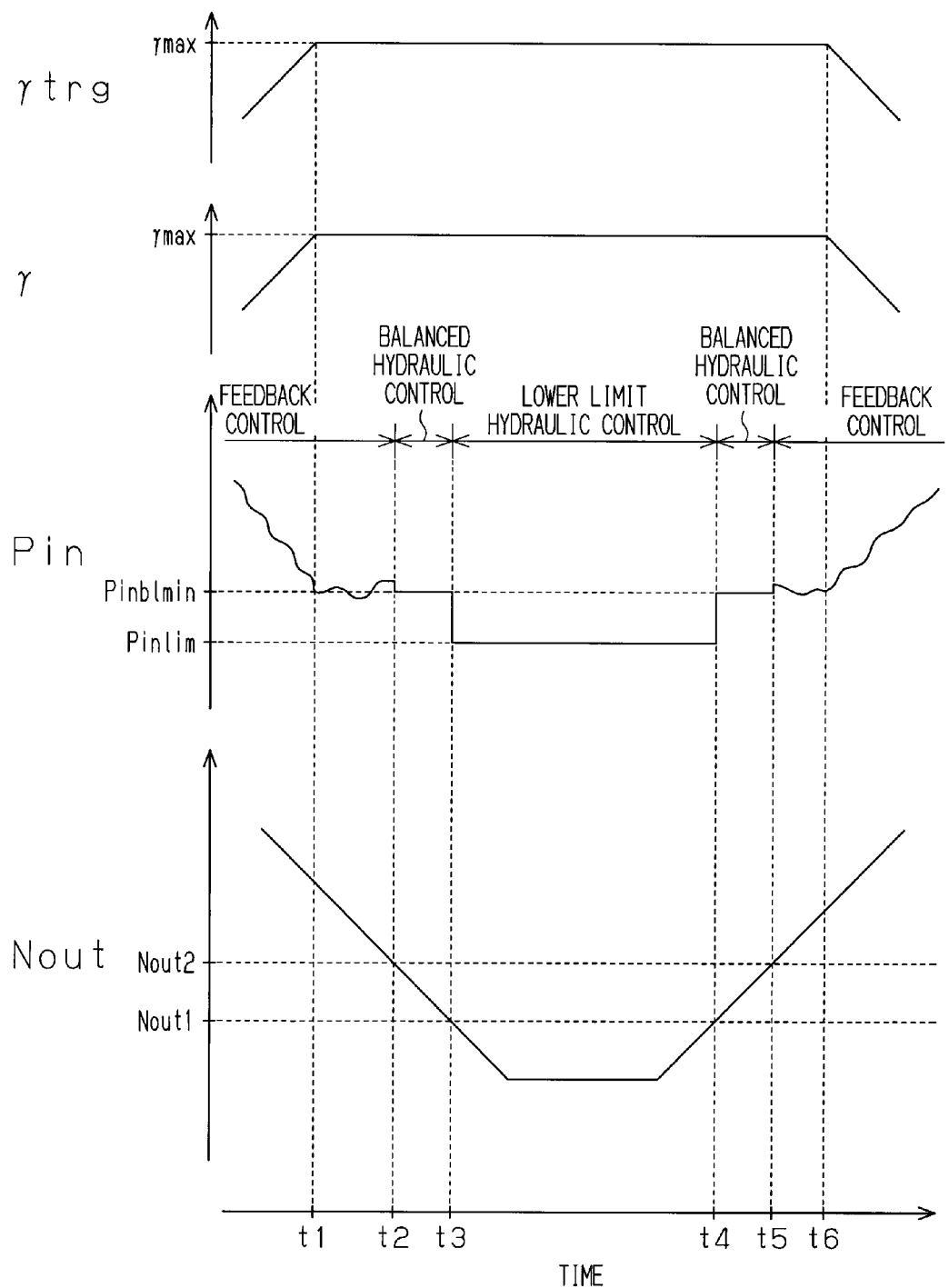
FIG. 7 is a time chart showing a relationship between changes in a rotational speed of a secondary pulley and changes in a hydraulic pressure of a primary pulley.

With reference to FIG. 7, description will be given of operation in a case in which the control mode for the hydraulic pressure Pin of the primary pulley 130 is switched depending on the rotational speed Nout of the secondary pulley 150. FIG. 7 is a time chart showing a relationship between changes in the rotational speed Nout of the secondary pulley 150 and changes in the hydraulic pressure Pin of the primary pulley 130.

As shown in FIG. 7, when the transmission gear ratio γ is less than the maximum transmission gear ratio γmax (before point in time t1), gear change control through normal feedback control is executed. Consequently, the hydraulic pressure Pin of the primary pulley 130 is subjected to the feedback control based on the difference between the transmission gear ratio γ and the target transmission gear ratio γtrg which is calculated based on the rotational speeds Nin and Nout.

When the transmission gear ratio γ reaches the maximum transmission gear ratio γmax at the point in time t1, the gear change control switching routine is executed. In the gear change control switching routine, then, it is determined that the rotational speed Nout of the secondary pulley is equal to or exceeds the second reference value Nout2, and the hydraulic pressure Pin is controlled to maintain the transmission gear ratio γ at the maximum transmission gear ratio γmax through the feedback control.

When the rotational speed Nout of the secondary pulley 150 is reduced to be less than the second reference value Nout2 at a point in time t2, thereafter, the balanced hydraulic control is executed through the gear change control switching routine. Consequently, the transmission gear ratio γ is not calculated based on the rotational speeds Nin and Nout, and the hydraulic control unit 200 is driven to cause the hydraulic pressure Pin to match the balanced hydraulic pressure Pinb1min.

When the rotational speed Nout of the secondary pulley 150 is further reduced and is less than the first reference value Nout1 at a point in time t3, the lower limit hydraulic control is executed through the gear change control switching routine. Consequently, the hydraulic pressure Pin of the primary pulley 130 is reduced down to the lower limit hydraulic pressure Pinlim, which is further less than the balanced hydraulic pressure Pinb1min.

On the other hand, when the rotational speed Nout of the secondary pulley 150 is increased and is equal to or exceeds the first reference value Nout1 at a point in time t4, the balanced hydraulic control is executed again through the gear change control switching routine. Consequently, the hydraulic pressure Pin of the primary pulley 130 is increased from the lower limit hydraulic pressure Pinlim to the balanced hydraulic pressure Pinb1min.

When the rotational speed Nout of the secondary pulley 150 is further increased and is equal to or exceeds the second reference value Nout2 at a point in time t5, thereafter, the feedback control is executed through the gear change control switching routine. Consequently, the actual transmission gear ratio γ is calculated based on the rotational speed Nout detected by the secondary rotational speed sensor 306 and the rotational speed Nin detected by the primary rotational speed sensor 305, and the hydraulic pressure Pin is subjected to the feedback control in order to maintain the transmission gear ratio γ at the maximum transmission gear ratio γmax based on the transmission gear ratio γ thus calculated.

When the target transmission gear ratio γtrg is reduced at a point in time t6, subsequently, the gear change control switching routine is not executed but the hydraulic pressure Pin of the primary pulley 130 is subjected to the feedback control in order to cause the transmission gear ratio γ to match the target transmission gear ratio γtrg through the feedback control by the normal gear change control, and the hydraulic pressure Pin is increased.

The electronic control device 300 according to the present embodiment executes the gear change control switching routine for switching the control mode for the hydraulic pressure Pin of the primary pulley 130 depending on the rotational speed Nout of the secondary pulley 150.

Only when the transmission gear ratio γ can be calculated with the necessary precision for the feedback control through the gear change control switching routine, the feedback control is executed.

On the other hand, when the transmission gear ratio γ cannot be calculated with the necessary precision for the feedback control, the feedback control is not executed but the hydraulic pressure Pin of the primary pulley 130 is maintained at a constant value. When the rotational speed Nout of the secondary pulley 150 is low and the rotational speed Nout cannot be detected by the secondary rotational speed sensor 306, the lower limit hydraulic control is executed to reduce the hydraulic pressure Pin of the primary pulley 130 down to the lower limit hydraulic pressure Pinlim. On the other hand, when the rotational speed Nout can be detected by the secondary rotational speed sensor 306 but the rotational speed Nout cannot be detected with the necessary precision for executing the feedback control, the balanced hydraulic control is executed to increase the hydraulic pressure Pin of the primary pulley 130 to the balanced hydraulic pressure Pinb1min, which is higher than the lower limit hydraulic pressure Pinlim.

According to the first embodiment described above, the following advantages are obtained.

(1) Referring to the gear change control switching routine according to the present embodiment, the lower limit hydraulic control is executed for regulating the hydraulic pressure Pin of the primary pulley 130 into the lower limit hydraulic pressure Pinlim when the rotational speed Nout of the secondary pulley 150 is less than the first reference value Nout1. For this reason, the primary pulley 130 is expanded by the tension of the belt 140, and the winding radius Rin of the belt 140 in the primary pulley 130 is reduced. Therefore, the transmission gear ratio γ can be maintained at the maximum transmission gear ratio γmax also in a state in which the actual transmission gear ratio γ cannot be calculated.

Referring to the gear change control switching routine according to the present embodiment, when the rotational speed Nout of the secondary pulley 150 is equal to or exceeds the first reference value Nout1, the hydraulic pressure Pin of the primary pulley 130 is set to be the balanced hydraulic pressure Pinb1min, which is higher than the lower limit hydraulic pressure Pinlim. Furthermore, the electronic control device 300 executes the feedback control for correcting the hydraulic pressure of the primary pulley 130 on the basis of the difference between the transmission gear ratio γ calculated based on the rotational speeds Nin and Nout and the target transmission gear ratio γtrg when the rotational speed Nout of the secondary pulley 150 is equal to or exceeds the second reference value Nout2.

For this reason, it is impossible to calculate the transmission gear ratio γ with the necessary precision for the feedback control. When the transmission gear ratio γ can be calculated, however, the hydraulic pressure Pin of the primary pulley 130 can be increased more greatly than in a state in which the actual transmission gear ratio γ cannot be calculated.

When the transmission gear ratio γ can be calculated with the necessary precision for the feedback control, the actual transmission gear ratio γ is calculated based on the rotational speeds Nin and Nout detected by the rotational speed sensors 305 and 306 and the hydraulic pressure Pin is subjected to the feedback control based on the difference between the calculated transmission gear ratio γ and the target transmission gear ratio γtrg.

In other words, the hydraulic pressure Pin of the primary pulley 130 is increased in advance based on the fact that the rotational speed Nout of the secondary pulley 150 is increased to be equal to or exceed the first reference value Nout1. Therefore, the hydraulic pressure Pin of the primary pulley 130 has already been increased to be higher than the lower limit hydraulic pressure Pinlim when the rotational speed Nout of the secondary pulley 150 is subsequently increased to be equal to or exceed the second reference value Nout2, and the transmission gear ratio γ can be calculated with the necessary precision for the feedback control. When the transmission gear ratio γ can be calculated with the necessary precision for the feedback control, accordingly, it is possible to regulate the hydraulic pressure Pin of the primary pulley 130 through the feedback control, thereby quickly restarting the change in the transmission gear ratio γ.

More specifically, according to the electronic control device 300 in accordance with the present embodiment, the transmission gear ratio γ can be maintained at the maximum transmission gear ratio γmax also in a state in which the transmission gear ratio γ cannot be calculated with high precision, and the change in the transmission gear ratio γ through the feedback control can be restarted quickly when the transmission gear ratio γ can be calculated with high precision.

(2) When the rotational speed Nout of the secondary pulley 150 is equal to or exceeds the first reference value Nout1 and is less than the second reference value Nout2, the balanced hydraulic control is executed for regulating the hydraulic pressure Pin of the primary pulley 130 into the balanced hydraulic pressure Pinb1min.

For this reason, when the rotational speed Nout of the secondary pulley 150 is equal to or exceeds the second reference value Nout2, the hydraulic pressure Pin of the primary pulley 130 has already been regulated to the balanced hydraulic pressure Pinb1min, which is the minimum hydraulic pressure necessary for maintaining the transmission gear ratio γ at the maximum transmission gear ratio γmax. Accordingly, when the rotational speed Nout of the secondary pulley 150 is equal to or exceeds the second reference value Nout2 and the transmission gear ratio γ can be calculated with the necessary precision for the feedback control, the actual transmission gear ratio γ can be quickly caused to match the maximum transmission gear ratio γmax through the feedback control.

(3) In a case in which the hydraulic oil of the primary pulley 130 is removed completely as in the control device for the continuously variable transmission described in the Patent Document 1 when the rotational speed Nout of the secondary pulley 150 is less than the first reference value Nout1, a long time is required for filling the primary pulley 130 with hydraulic oil when the rotational speed Nout of the secondary pulley 150 is equal to or exceeds the first reference value Nout1.

In contrast, referring to the gear change control switching routine according to the first embodiment, the lower limit hydraulic control is executed for regulating the hydraulic pressure Pin of the primary pulley 130 into the lower limit hydraulic pressure Pinlim to cause the transmission gear ratio γ to be the maximum transmission gear ratio γmax when the rotational speed Nout of the secondary pulley 150 is less than the first reference value Nout1.

Therefore, the transmission gear ratio γ can be maintained at the maximum transmission gear ratio γmax in a state in which the primary pulley 130 is filled with hydraulic oil. Thus, it is possible to eliminate the drawback that a long time is required for filling the primary pulley 130 with the hydraulic oil.

(4) Even if there are variations in characteristics of the continuously variable transmission 100, the lower limit hydraulic pressure Pinlim is set to be a hydraulic pressure capable of reliably maintaining the transmission gear ratio γ at the maximum transmission gear ratio γmax, by taking into consideration such variations in the characteristics. Therefore, even if there are variations in characteristics of the continuously variable transmission 100 due to fabrication tolerances or the like, the transmission gear ratio γ can reliably be maintained at the maximum transmission gear ratio γmax through the lower limit hydraulic control.

If the lower limit hydraulic pressure Pinlim is set to be a value that approximates to the balanced hydraulic pressure Pinblmin to be the target hydraulic pressure Pintrg in the balanced hydraulic control, it is possible to quickly increase the hydraulic pressure Pin to the target hydraulic pressure Pintrg in the balanced hydraulic control in a transition from the lower limit hydraulic control to the balanced hydraulic control. Accordingly, it is necessary to set the lower limit hydraulic pressure Pinlim to be such a low hydraulic pressure that the transmission gear ratio γ can reliably be maintained at the maximum transmission gear ratio γmax even if the characteristic of the continuously variable transmission 100 basically has the variation as described above. However, it is desirable to set the transmission gear ratio γ to have a value that approximates to the balanced hydraulic pressure Pinblmin.

(5) If the lower limit hydraulic control is executed immediately to reduce the hydraulic pressure Pin down to the lower limit hydraulic pressure Pinlim when the rotational speed Nout of the secondary pulley 150 is decreased to be less than the second reference value Nout2, the hydraulic pressure Pin is reduced down to the lower limit hydraulic pressure Pinlim, and the gear change control cannot be restarted immediately in a case in which the rotational speed Nout is reduced to be less than the second reference value Nout2, and then, is not reduced to be less than the first reference value Nout1 but is increased to be equal to or exceed the second reference value Nout2 again.

In contrast, referring to the gear change control switching routine according to the first embodiment, when the rotational speed Nout of the secondary pulley 150 is reduced to be less than the second reference value Nout2, and the transmission gear ratio γ cannot be calculated with necessary precision for executing the feedback control, the lower limit hydraulic control is not immediately executed to reduce the hydraulic pressure Pin down to the lower limit hydraulic pressure Pinlim but the balanced hydraulic control is executed to maintain the hydraulic pressure Pin at the balanced hydraulic pressure Pinblmin until the rotational speed Nout becomes less than the first reference value Nout1.

In a case in which the rotational speed Nout is reduced to be less than the second reference value Nout2, and then, is not reduced to be less than the first reference value Nout1 but is increased to be equal to or exceed the second reference value Nout2 again, it is possible to immediately restart the gear change control through the feedback control.

Second Embodiment

With reference to FIGS. 8 to 12, description will be given of a second embodiment in which the control device for a continuously variable transmission according to the present invention is materialized as an electronic control device 300 for controlling a vehicle in an overall manner. In the second embodiment, a part of the gear change control switching routine according to the first embodiment is changed. In the following part, therefore, respects changed from the gear change control switching routine according to the first embodiment will be described intensively, and the same portions as those in the first embodiment have the same reference numerals and detailed explanation thereof will not be repeated.

Figure 8:
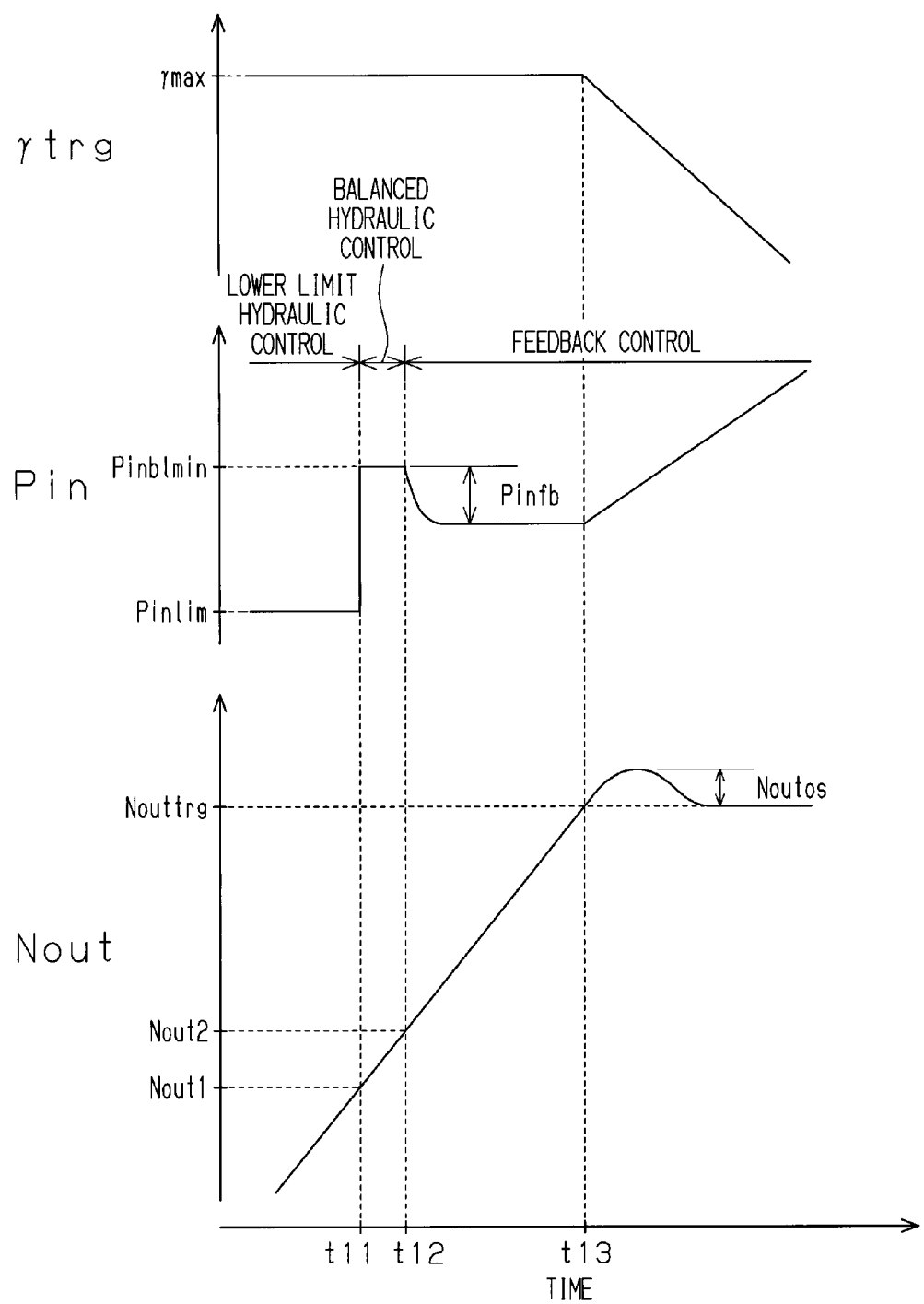
FIG. 8 is a time chart showing changes in the rotational speed of the secondary pulley and changes in the hydraulic pressure of the primary pulley in a case in which the gear change control switching routine is executed according to the first embodiment.

In a case in which the gear change control switching routine according to the first embodiment is executed as shown in FIG. 8, a hydraulic pressure Pin of a primary pulley 130 is regulated to a balanced hydraulic pressure Pinblmin through a balanced hydraulic control from when it is determined that a rotational speed Nout is equal to or exceeds a first reference value Nout1 at a point in time t11 until it is determined that the rotational speed Nout is equal to or exceeds a second reference value Nout2 at a point in time t12. However, the continuously variable transmission 100 has variations in characteristics due to fabrication tolerances or the like as described above. For this reason, even if a balanced hydraulic pressure Pinblmin, which is a necessary minimum hydraulic pressure for maintaining a transmission gear ratio γ at a maximum transmission gear ratio γmax, is calculated and the hydraulic pressure Pin of the primary pulley 130 is regulated to a hydraulic pressure that is equal to the balanced hydraulic pressure Pinb1min in a balanced hydraulic control, the actual transmission gear ratio γ is displaced from the maximum transmission gear ratio γmax in some cases.

In some cases in which the gear change control switching routine according to the first embodiment is executed, an overshoot in which a rotational speed Nout of a secondary pulley 150 exceeds a target rotational speed Nouttrg is caused when a target transmission gear ratio γtrg is reduced to make a transition from a feedback control through the gear change control switching routine to a feedback control through a normal gear change control at a point in time t13 as shown in FIG. 8.

Figure 9:
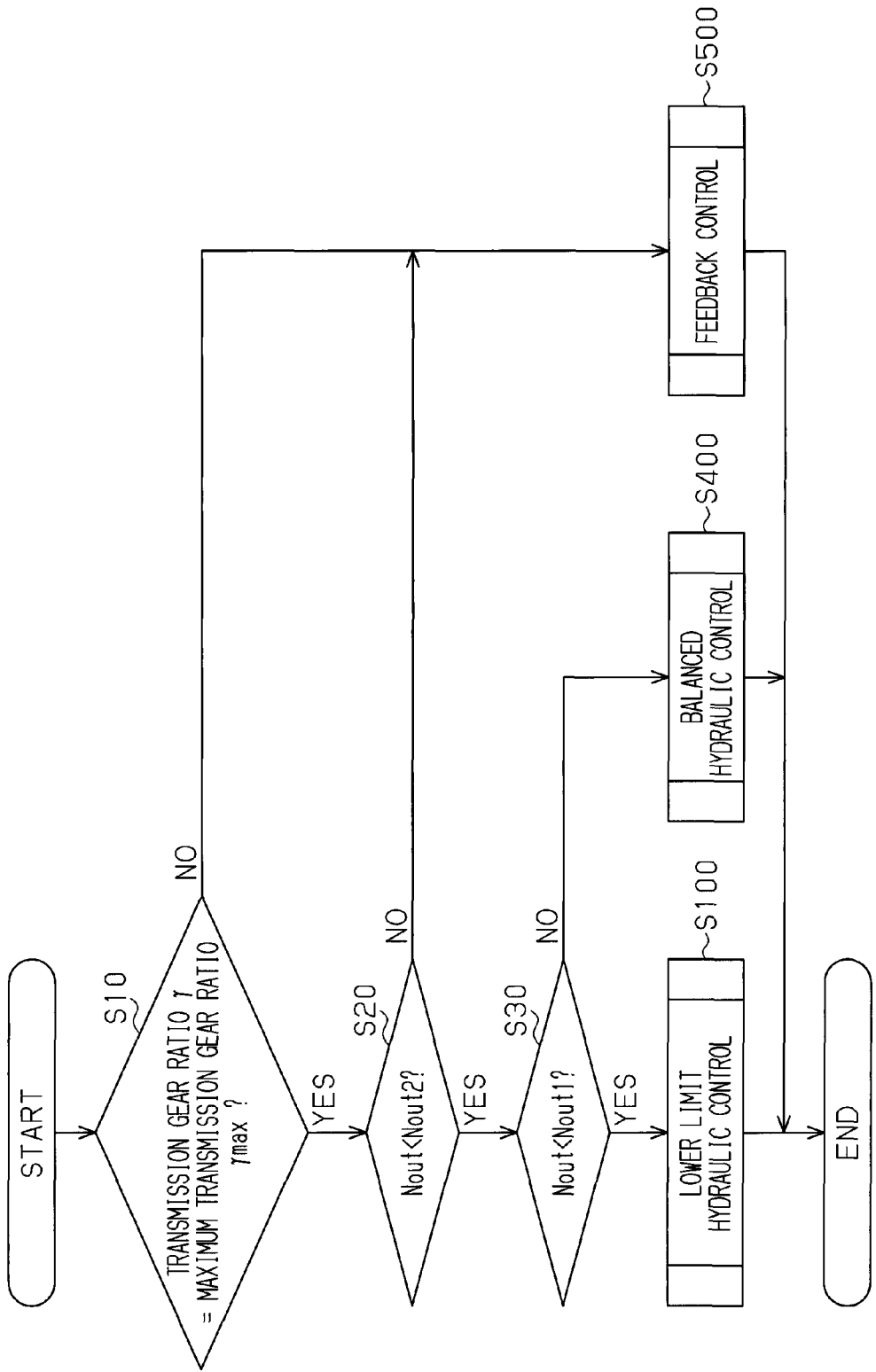
FIG. 9 is a flowchart showing a serial processing flow related to a gear change control switching routine according to a second embodiment.

Referring to the gear change control switching routine according to the present embodiment, therefore, a feedback control (step S500) for acquiring a learning value Pinlrn based on a correction value Pinfb and an overshoot amount Noutos shown in FIG. 8 is executed in place of the feedback control of Step S300 described in the first embodiment as shown in FIG. 9. In place of the balanced hydraulic control of Step S200 described in the first embodiment, a balanced hydraulic control (Step S400) for correcting a target hydraulic pressure Pintrg is executed based on the learning value Pinlrn acquired through the feedback control of Step S500.

Figure 10:
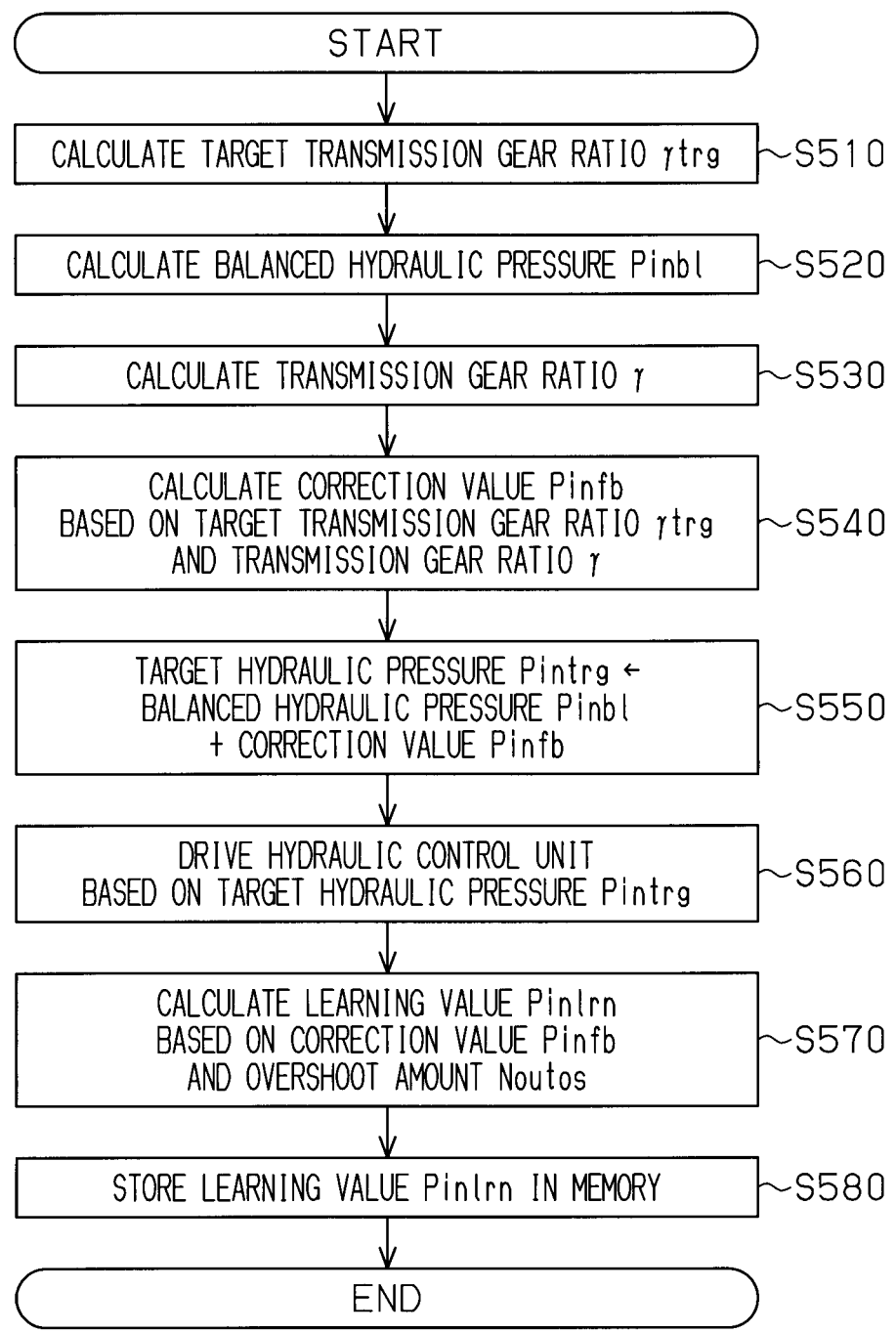
FIG. 10 is a flowchart showing a serial processing flow related to a feedback control in the gear change control switching routine according to the second embodiment.

When the feedback control of Step S500 in FIG. 9 is started, the electronic control device 300 according to the present embodiment first executes the same processings as the Steps S310 to S360 in the feedback control according to the first embodiment at Steps S510 to S560 as shown in FIG. 10. In other words, the target hydraulic pressure Pintrg is set by a correction value Pinfb and a balanced hydraulic pressure Pinb1 through the processings in the Steps S510 to S560, and a hydraulic control unit 200 is driven based on the target hydraulic pressure Pintrg thus set.

When driving the hydraulic control unit 200, the electronic control device 300 calculates the learning value Pinlrn based on the correction value Pinfb and the overshoot amount Noutos at Step S570.

The overshoot amount Noutos is a value corresponding to the magnitude of the overshoot of the rotational speed Nout of the secondary pulley 150, which is generated in the transition from the feedback control in the gear change control switching routine to the feedback control through the normal gear change control as shown in FIG. 8. At Step S570 are read the overshoot amount Noutos that has been generated in the transition from the feedback control in the gear change control switching routine to the feedback control in the normal gear change control in the previous cycle and the correction value Pinfb in the previous execution of the feedback control in the gear change control switching routine. Then, the learning value Pinlrn is calculated based on the overshoot amount Noutos and the correction value Pinfb.

The learning value Pinlrn is equivalent to a correction amount for correcting the target hydraulic pressure Pintrg in the balanced hydraulic control as described above. At Step S570, therefore, the learning value Pinlrn is set such that the correction amount of the target hydraulic pressure Pintrg in the balanced hydraulic control is increased as the correction amount of the balanced hydraulic pressure Pinb1 through the correction value Pinfb in the feedback control is increased and as the overshoot amount Noutos is increased.

More specifically, the electronic control device 300 sets, with no change, the correction value Pinfb into the learning value Pinlrn if the overshoot amount Noutos is 0. On the other hand, if the overshoot amount Noutos is not 0, the electronic control device 300 calculates, as the learning value Pinlrn, a value obtained by regulating the correction value Pinfb corresponding to the overshoot amount Noutos such that the target hydraulic pressure Pintrg in the balanced hydraulic control is reduced as the overshoot amount Noutos is increased.

When the learning value Pinlrn is calculated, thus, the electronic control device 300 stores the learning value Pinlrn in a nonvolatile memory and once ends the feedback control.

The processings of the Steps S570 and S580 in the feedback control correspond to a learning value acquiring unit.

Figure 11:
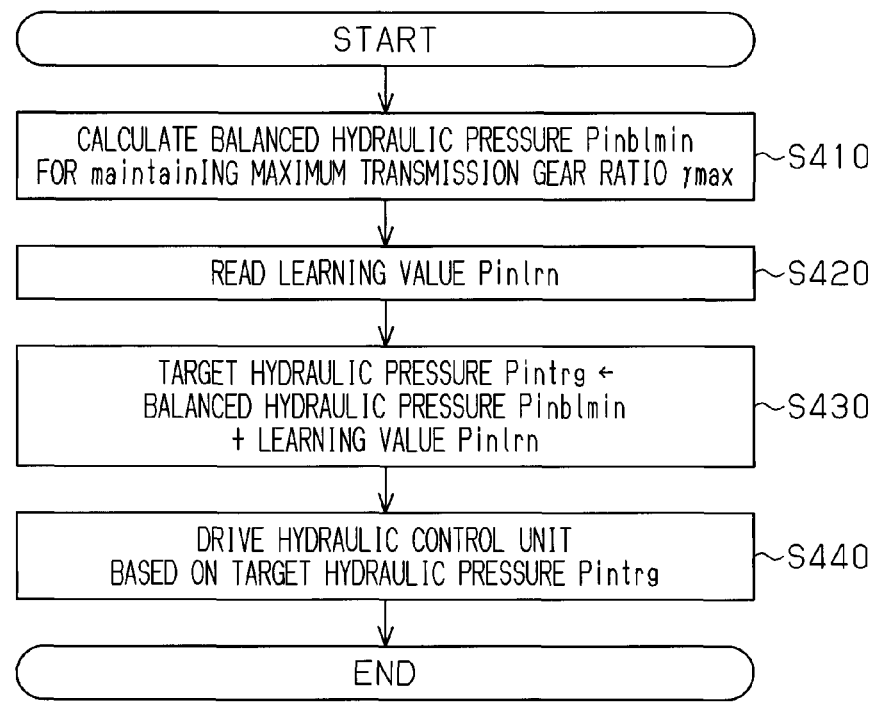
FIG. 11 is a flowchart showing a serial processing flow related to a balanced hydraulic control in the gear change control switching routine according to the second embodiment.

When starting the balanced hydraulic control of Step S400 in FIG. 9, the electronic control device 300 according to the present embodiment first calculates the balanced hydraulic pressure Pinb1min for maintaining the transmission gear ratio γ at the maximum transmission gear ratio γmax at Step S410 in the same manner as Step S210 for the balanced hydraulic control according to the first embodiment as shown in FIG. 11.

Then, the electronic control device 300 reads the learning value Pinlrn acquired through the feedback control in Step S500 at Step S420, and adds the learning value Pinlrn to the balanced hydraulic pressure Pinb1min at Step S430, thereby correcting the target hydraulic pressure Pintrg.

When thus correcting the target hydraulic pressure Pintrg, the electronic control device 300 drives the hydraulic control unit 200 based on the target hydraulic pressure Pintrg so as to cause the hydraulic pressure Pin of the primary pulley 130 to match the target hydraulic pressure Pintrg at Step S440.

In other words, referring to the gear change control switching routine according to the present embodiment, when the hydraulic pressure Pin is regulated through the balanced hydraulic control, the hydraulic control unit 200 is driven to correct the balanced hydraulic pressure Pinb1min with the learning value Pinlrn and to cause the hydraulic pressure Pin of the primary pulley 130 to match the balanced hydraulic pressure Pinb1min thus corrected.

When the hydraulic control unit 200 is thus driven, the electronic control device 300 once ends the balanced hydraulic control.

Figure 12:
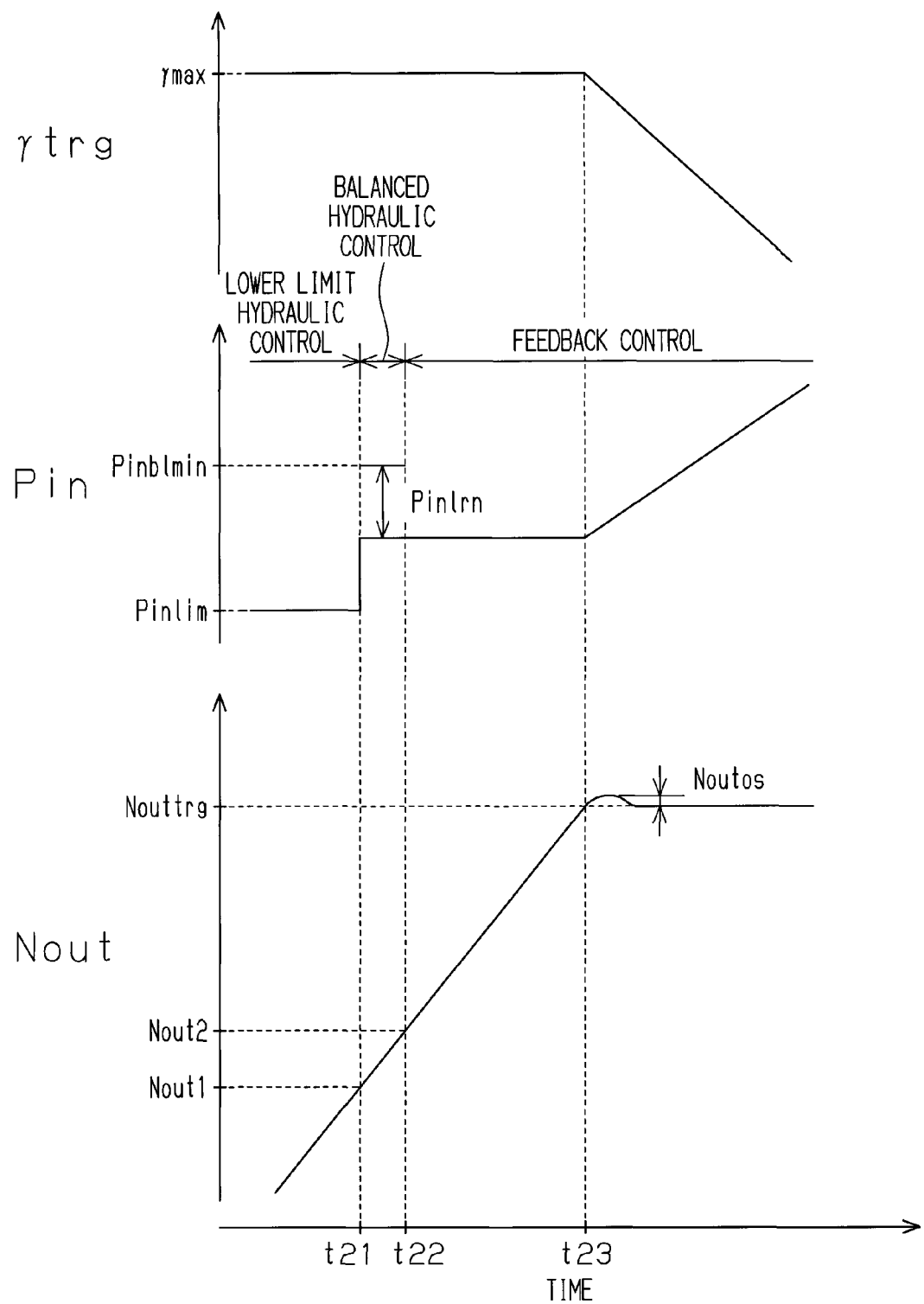
FIG. 12 is a time chart showing changes in a rotational speed of a secondary pulley and changes in a hydraulic pressure of a primary pulley in a case in which the gear change control switching routine is executed according to the second embodiment.

With reference to FIG. 12, description will be given of operation in a case in which a learning value acquiring unit is provided for acquiring the learning value Pinlrn, and the gear change control switching routine is executed for correcting the balanced hydraulic pressure Pinb1min to be the target hydraulic pressure Pintrg in the balanced hydraulic control with the learning value Pinlrn. FIG. 12 is a time chart showing changes in the rotational speed Nout of the secondary pulley 150 and changes in the hydraulic pressure Pin of the primary pulley 130 in a case in which the gear change control switching routine according to the present embodiment is executed.

As shown in FIG. 12, when the rotational speed Nout of the secondary pulley 150 is less than the first reference value Nout1 (before a point in time t21), the hydraulic pressure Pin of the primary pulley 130 is regulated to the lower limit hydraulic pressure Pinlim through the lower limit hydraulic control.

In contrast, when the rotational speed Nout of the secondary pulley 150 is increased, and the rotational speed Nout is equal to or exceeds the first reference value Nout1 at the point in time t21, the balanced hydraulic control is executed through the gear change control switching routine. At this time, referring to the balanced hydraulic control in the gear change control switching routine according to the present embodiment, the hydraulic pressure Pin is regulated to be equal to the hydraulic pressure obtained by correcting the balanced hydraulic pressure Pinb1min with the learning value Pinlrn as shown in FIG. 12.

For this reason, the hydraulic pressure Pin is regulated on almost the same level as the hydraulic pressure Pin (the hydraulic pressure Pin after a point in time t22) to be regulated through the feedback control at the point in time t21 that the rotational speed Nout is equal to or exceeds the first reference value Nout1.

Moreover, the learning value Pinlrn is calculated by referring to the overshoot amount Noutos of the rotational speed Nout of the secondary pulley 150 in the previous cycle. At a point in time t23, therefore, the target transmission gear ratio γtrg is varied, and the overshoot amount Noutos generated in the transition to the feedback control in the normal gear change control is reduced.

According to the second embodiment described above, it is possible to obtain the following advantages in addition to the advantages (1) to (5) according to the first embodiment.

(6) When the balanced hydraulic control is executed, the learning value Pinlrn acquired through the previous feedback control is utilized to correct the balanced hydraulic pressure Pinb1min, thereby correcting the hydraulic pressure Pin of the primary pulley 130. Therefore, it is possible to grasp the characteristics of the continuously variable transmission 100 based on the learning value Pinlrn acquired through the previous feedback control, thereby executing the balanced hydraulic control conforming to the characteristics.

(7) The learning value Pinlrn is set based on the correction value Pinfb such that the correction amount in the balanced hydraulic control is increased as the correction amount of the balanced hydraulic pressure Pinb1 in the feedback control is increased. For this reason, the learning value Pinlrn is set such that the correction amount in the balanced hydraulic control is increased when it is estimated that the correction amount of the balanced hydraulic pressure Pinb1 in the feedback control is large and the hydraulic pressure Pin of the primary pulley 130, which is required for maintaining the transmission gear ratio γ at the target transmission gear ratio γtrg is greatly displaced from the balanced hydraulic pressure Pinb1min. Accordingly, it is possible to execute the balanced hydraulic control conforming to the actual characteristic of the continuously variable transmission 100, thereby maintaining the transmission gear ratio γ at the maximum transmission gear ratio γmax more properly through the balanced hydraulic control.

(8) Transition from the balanced hydraulic control to the feedback control is made, and the learning value Pinlrn is acquired by referring to the overshoot amount Noutos of the rotational speed Nout of the secondary pulley 150, which is generated when the change in the transmission gear ratio γ is started through the feedback control. By correcting the hydraulic pressure Pin of the primary pulley 130, which is regulated through the balanced hydraulic control based on the learning value Pinlrn, it is possible to suppress the overshoot of the rotational speeds Nin and Nout of the pulleys 130 and 150 which is generated when starting the change in the transmission gear ratio γ.

(9) The learning value Pinlrn is set based on the overshoot amount Noutos such that the correction amount in the balanced hydraulic control is increased as the overshoot amount Noutos is increased. For this reason, the learning value Pinlrn is set such that the more likely the estimated characteristics are to cause overshoot, the greater the correction amount in the balanced hydraulic control becomes. Accordingly, it is possible to execute the balanced hydraulic control conforming to the actual characteristic of the continuously variable transmission 100, thereby suppressing the occurrence of the overshoot more properly.

The second embodiment may also be modified as described below.

Although there has been described the configuration in which the learning value Pinlrn is calculated based on both the correction value Pinfb and the overshoot amount Noutos in the second embodiment, it is also possible to employ a configuration in which the learning value Pinlrn is calculated based on either of the correction value Pinfb and the overshoot amount Noutos.

Although there has been described the configuration in which the learning value Pinlrn is calculated by referring to the overshoot amount Noutos of the rotational speed Nout of the secondary pulley 150 in the second embodiment, it is also possible to employ a configuration in which the learning value Pinlrn is calculated by referring to the overshoot amount of the rotational speed Nin of the primary pulley 130.

Each of the embodiments described above may also be modified as follows.

The rotational speed Nout of the secondary pulley 150 may also be calculated based on the rotational speed of the wheel that is detected by the wheel speed sensor 307. Therefore, it is also possible to employ a configuration in which it is determined whether the rotational speed Nout is less than the second reference value Nout based on the rotational speed of the wheel detected by the wheel speed sensor 307 or a configuration in which it is determined whether the rotational speed Nout is less than the first reference value Nout based on the rotational speed of the wheel detected by the wheel speed sensor 307.

If the transmission gear ratio γ matches the maximum transmission gear ratio γmax, the rotational speed Nout of the secondary pulley 150 can be calculated based on the value of the maximum transmission gear ratio γmax and the rotational speed Nin of the primary pulley 130. Therefore, it is also possible to employ a configuration in which it is determined whether the rotational speed Nout is less than the second reference value Nout based on the rotational speed Nin of the primary pulley 130 detected by the primary rotational speed sensor 305. Furthermore, it is also possible to employ a configuration in which it is determined whether the rotational speed Nout is less than the first reference value Nout based on the rotational speed Nin of the primary pulley 130 detected by the primary rotational speed sensor 305.

In addition, it is also possible to estimate the rotational speed Nin of the primary pulley 130 based on the rotational speed of the turbine of the torque converter 110 detected by the turbine rotational speed sensor 304. Therefore, if the transmission gear ratio γ matches the maximum transmission gear ratio γmax, it is also possible to employ a configuration in which it is determined whether the rotational speed Nout is less than the second reference value Nout based on the rotational speed of the turbine of the torque converter 110 detected by the turbine rotational speed sensor 304. It is also possible to employ a configuration in which it is determined whether the rotational speed Nout is less than the first reference value Nout based on the rotational speed of the turbine of the torque converter 110 detected by the turbine rotational speed sensor 304.

In each of the embodiments, there has been described the configuration in which the first reference value Nout1 is set to be the lower limit of the rotational speed Nout, which allows calculation of the transmission gear ratio γ based on the rotational speeds Nin and Nout, while the second reference value Nout2 is set to be the lower limit of the rotational speed Nout, which allows calculation of the transmission gear ratio γ with the necessary precision for the feedback control based on the rotational speeds Nin and Nout. In contrast, if the second reference value Nout2 exceeds the first reference value Nout1, it is possible to properly change the reference values Nout1 and Nout2. Also in a case in which the respective reference values Nout1 and Nout2 are set in a different mode from each of the embodiments, the feedback control can be restarted when the rotational speed Nout of the secondary pulley 150 is equal to or exceeds the second reference value Nout2 and the transmission gear ratio γ can be calculated with high precision to some degree.

That is, the transmission gear ratio γ can be maintained at the maximum transmission gear ratio γmax also in the state in which the transmission gear ratio γ cannot be calculated with high precision, and the change in the transmission gear ratio γ through the feedback control can be restarted quickly when the transmission gear ratio γ can be calculated with high precision.

Although there has been described the configuration in which the vehicle speed SPD is calculated based on the rotational speed Nout of the secondary pulley 150 detected by the secondary rotational speed sensor 306 in each of the embodiments, it is also possible to calculate the vehicle speed SPD based on the rotational speed of the wheel detected by the wheel speed sensor 307.

Although there has been described the configuration in which the secondary rotational speed sensor 306 is employed as the rotational speed sensor for detecting the rotational speed of the power transmission system from the internal combustion engine to the wheel in each of the embodiments, it is also possible to calculate the rotational speed Nout of the secondary pulley 150 based on the rotational speed of the wheel detected by the wheel speed sensor 307 as described above. Therefore, it is also possible to employ the wheel speed sensor 307 as the rotational speed sensor for detecting the rotational speed of the power transmission system.

In addition, it is possible to properly change any rotational speed sensor for detecting the rotational speed of the power transmission system if it can estimate the rotational speed Nout of the secondary pulley 150 based on the detected rotational speed. Therefore, the present invention can also be applied to a control device for a continuously variable transmission for calculating the actual transmission gear ratio based on the engine speed NE or the vehicle speed SPD by estimating the rotational speed Nin of the primary pulley 130 based on the engine speed NE or estimating the rotational speed Nout of the secondary pulley 150 based on the vehicle speed SPD.

In brief, the present invention may also be applied to a control device for a continuously variable transmission that does not include the rotational speed sensors 305 and 306, as long as the configuration in which the rotational speeds Nin and Nout of the pulleys 130 and 150 can be estimated is employed.

EXPLANATION OF REFERENCE SIGNS

100 . . . continuously variable transmission, 110 . . . torque converter, 120 . . . switching mechanism, 121 . . . forward clutch, 122 . . . reverse brake, 130 . . . primary pulley, 131 . . . fixed sheave, 132 . . . movable sheave, 133 . . . housing, 134 . . . hydraulic chamber, 140 . . . belt, 150 . . . secondary pulley, 151 . . . fixed sheave, 152 . . . movable sheave, 153 . . . housing, 154 . . . hydraulic chamber, 160 . . . reduction gear, 170 . . . differential gear, 200 . . . hydraulic control unit, 300 . . . electronic control device, 301 . . . accelerator position sensor, 302 . . . air flow meter, 303 . . . crank angle sensor, 304 . . . turbine rotational speed sensor, 305 . . . primary rotational speed sensor, 306 . . . secondary rotational speed sensor, 307 . . . wheel speed sensor.

The invention claimed is:

1. A control device for a continuously variable transmission, the continuously variable transmission including a primary pulley to which drive force of an internal combustion engine is input, a secondary pulley coupled to a vehicle wheel, and a belt wound upon the pair of pulleys for transmitting the drive force, wherein the control device controls hydraulic pressure to be supplied to each of the pulleys to change a winding radius of the belt in each of the pulleys, and executes feedback control of the hydraulic pressure of the primary pulley based on an actual transmission gear ratio calculated based on a rotational speed of each of the pulleys and a target transmission gear ratio, the control device comprising:

a rotational speed sensor for detecting a rotational speed of at least a part of a power transmission system from the internal combustion engine to the wheel, wherein when the rotational speed is less than a first reference value, the control device does not execute the feedback control and executes a lower limit hydraulic control for regulating the hydraulic pressure of the primary pulley to a lower limit hydraulic pressure capable of setting a transmission gear ratio to be a maximum transmission gear ratio, when the rotational speed is equal to or exceeds the first reference value and is less than a second reference value, which is larger than the first reference value, the control device does not execute the feedback control and executes a balanced hydraulic control for regulating the hydraulic pressure of the primary pulley to a minimum hydraulic pressure, which is higher than the lower limit hydraulic pressure and required for maintaining the transmission gear ratio at the maximum transmission gear ratio, and when the rotational speed is equal to or exceeds the second reference value the control device executes the feedback control.

2. The control device for a continuously variable transmission according to claim 1, wherein the first reference value is set based on a lower limit of the rotational speed that allows calculation of the transmission gear ratio based on the rotational speed of each of the pulleys.

3. The control device for a continuously variable transmission according to claim 1, wherein the second reference value is set based on a lower limit of the rotational speed that allows calculation of the transmission gear ratio with necessary precision for the feedback control based on the rotational speed of each of the pulleys.

4. The control device for a continuously variable transmission according to claim 1, wherein the rotational speed sensor is a secondary rotational speed sensor for detecting the rotational speed of the secondary pulley.

5. The control device for a continuously variable transmission according to claim 1, wherein the control device calculates a target hydraulic pressure in the balanced hydraulic control based on a torque input from the internal combustion engine to the primary pulley, the winding radius of the belt in the primary pulley when the transmission gear ratio is equal to a maximum transmission gear ratio, a frictional coefficient between the primary pulley and the belt, a gradient of a portion in the primary pulley with which the belt comes in contact, and a pressure receiving area of a movable sheave in the primary pulley.

6. The control device for a continuously variable transmission according to claim 1, wherein through the feedback control, the control device calculates a balanced hydraulic pressure, which is a minimum hydraulic pressure required for maintaining the transmission gear ratio at a target transmission gear ratio without a slip of the belt over each of the pulleys, calculates a correction value based on the difference between the transmission gear ratio calculated based on the rotational speed of each of the pulleys and the target transmission gear ratio, and regulates the hydraulic pressure of the primary pulley by setting, as a target hydraulic pressure, a value obtained by correcting the balanced hydraulic pressure with the correction value, the control device further comprises a learning value acquiring unit for acquiring a learning value based on the correction value calculated through the feedback control, and when executing the balanced hydraulic control, the control device corrects the hydraulic pressure of the primary pulley by using the learning value acquired by the learning value acquiring unit through the previous feedback control.

7. The control device for a continuously variable transmission according to claim 6, wherein the learning value acquiring unit sets a magnitude of the learning value based on a magnitude of the correction value such that the greater a correction amount of the balanced hydraulic pressure through the correction value in the feedback control, the greater becomes a correction amount of the hydraulic pressure in the balanced hydraulic control.

8. The control device for a continuously variable transmission according to claim 1, further comprising a learning value acquiring unit for acquiring a learning value based on a magnitude of an overshoot of the rotational speed of each pulley that is generated at start of a change in the transmission gear ratio through the feedback control after a transition from the balanced hydraulic control to the feedback control, wherein, when executing the balanced hydraulic control, the control device corrects the hydraulic pressure of the primary pulley by using the learning value acquired by the learning value acquiring unit through the previous feedback control.

9. The control device for a continuously variable transmission according to claim 8, wherein the learning value acquiring unit sets a magnitude of the learning value based on the magnitude of the overshoot such that the greater the overshoot, the greater becomes a correction amount of the hydraulic pressure in the balanced hydraulic control.

* * * * *